US012689410B2

(12) United States Patent
Kim et al.

(10) Patent No.: US 12,689,410 B2
(45) Date of Patent: Jul. 21, 2026

(54) COMMUNICATION DEVICE

(71) Applicant: Korea Advanced Institute of Science and Technology, Daejeon (KR)

(72) Inventors: Song Min Kim, Daejeon (KR); Kang Min Bae, Daejeon (KR); Nam Jo Ahn, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 551 days.

(21) Appl. No.: 18/072,322

(22) Filed: Nov. 30, 2022

(65) Prior Publication Data

US 2023/0179258 A1 Jun. 8, 2023

(30) Foreign Application Priority Data

Dec. 2, 2021 (KR) ......................... 10-2021-0171342
May 31, 2022 (KR) ......................... 10-2022-0066611

(51) Int. Cl.
*H04B 5/77* (2024.01)

(52) U.S. Cl.
CPC ..................................... *H04B 5/77* (2024.01)

(58) Field of Classification Search
CPC ... H04B 5/77; H04B 1/10; H04B 7/22; H04B 2001/0491; H04L 27/103; H04L 27/12; H04L 27/14; H04L 67/12; H02J 7/0063; H02J 50/001
See application file for complete search history.

(56) References Cited

U.S. PATENT DOCUMENTS

| | | | |
|---|---|---|---|
| 6,046,683 A | | 4/2000 | Pidwerbetsky et al. |
| 6,084,530 A | * | 7/2000 | Pidwerbetsky ...... G06K 7/0008 |
| | | | 342/51 |
| 6,107,910 A | * | 8/2000 | Nysen ................... G01S 13/755 |
| | | | 340/10.3 |
| 7,978,636 B2 | | 7/2011 | Gaur |
| 9,504,032 B2 | | 11/2016 | Wang et al. |
| 10,070,386 B2 | | 9/2018 | Dinh et al. |
| 10,812,130 B2 | | 10/2020 | Talla et al. |

(Continued)

FOREIGN PATENT DOCUMENTS

| | | |
|---|---|---|
| CN | 1741514 A | 3/2006 |
| CN | 102741863 A | 10/2012 |

(Continued)

OTHER PUBLICATIONS

Korean Application No. 10-2022-0066611; Korean Office Action dated Jul. 26, 2024; 5 pgs.

(Continued)

*Primary Examiner* — Md K Talukder
(74) *Attorney, Agent, or Firm* — Tarolli, Sundheim, Covell & Tummino LLP

(57) ABSTRACT

Provided is a communication device. The communication device includes an interrogator configured to output an interrogation signal in which unit chirp signals that vary from a first frequency to a second frequency are continuous, and backscatter tags configured to receive the interrogation signal and each provide a tag signal formed by frequency modulation on the interrogation signal, wherein the interrogator receives the tag signals and demodulates the tag signals.

20 Claims, 32 Drawing Sheets

(56) References Cited

U.S. PATENT DOCUMENTS

| | | | |
|---|---|---|---|
| 11,688,929 B2 * | 6/2023 | Charvat | H01Q 1/2283 |
| | | | 455/41.1 |
| 2004/0130442 A1 | 7/2004 | Breed et al. | |
| 2006/0045219 A1 | 3/2006 | Wang et al. | |
| 2007/0109099 A1 | 5/2007 | Raphaeli et al. | |
| 2007/0296305 A1 | 12/2007 | Hines et al. | |
| 2011/0187509 A1 | 8/2011 | Raptis et al. | |
| 2014/0229387 A1 | 8/2014 | Chow | |
| 2015/0318881 A1 * | 11/2015 | Barott | H04B 1/10 |
| | | | 375/285 |
| 2016/0187223 A1 | 6/2016 | Preston et al. | |
| 2016/0191163 A1 | 6/2016 | Preston et al. | |
| 2017/0181118 A1 * | 6/2017 | Charvat | H01Q 1/2283 |
| 2020/0125810 A1 | 4/2020 | Pettus | |
| 2020/0160133 A1 * | 5/2020 | Zajic | G06K 19/07749 |
| 2020/0267561 A1 | 8/2020 | Lakshminarayan et al. | |
| 2021/0114205 A1 | 4/2021 | Cristache | |
| 2021/0121967 A1 | 4/2021 | Vetter | |
| 2021/0373111 A1 * | 12/2021 | Hui | G01S 1/0428 |
| 2023/0179258 A1 * | 6/2023 | Kim | H04B 5/77 |
| | | | 455/41.2 |

FOREIGN PATENT DOCUMENTS

| | | | |
|---|---|---|---|
| CN | 113556148 A | 10/2021 | |
| JP | 2004153558 A | 5/2004 | |
| JP | 2008-245278 A | 10/2008 | |
| KR | 10-1709421 B1 | 2/2017 | |
| KR | 10-2017-0036455 A | 4/2017 | |

OTHER PUBLICATIONS

USENIX, the Advanced Computing Systems Association, "NSDI '22: 19th USENIX Symposium on Networked Systems Design and Implementation", Apr. 4-6, 2022, www.usenix.org/nsdi22/cfp.

Applicant: Korea Institute of Science and Technology; Chinese Application No. 202211539902.3; Chinese Office Action dated Feb. 21, 2025; 3 pgs.

Kang Min Bae et al., "OmniScatter: Extreme Sensitivity mmWave backscattering Using Commodity FMCW Radar," In Proceedings of the 20th Annual International Conference on Mobile Systems, Applications and Services (MobiSys '22), Jun. 25 to Jul. 1, 2022, pp. 316-329 URL:https://doi.org/10.1145/3498361.3538924.

Huang Zhuang et al., "Research on Backscatter Communication System of Automotive Radar Based on Spread Spectrum," Radar Science and Technology, Jun. 2020, vol. 18, No. 3, pp. 247-253, and p. 261, DOI: 10.3969/j.issn.1672-2337.2020.03.003, URL:http://radarst.ijournal.cn/ldkxyjs/ch/reader/create_pdf.aspx?file_no= 202003003&flag=1&journal_id=ldkxyjs&year_id=2020.

Chinese Patent Application No. 202211539902.3; Notice of Allowance dated Nov. 11, 2025.

Song Min Kim; "Method and Device for Performing Communication Based on Backscatter in Wireless Communication System"; Office Action dated May 30, 2025, for U.S. Appl. No. 18/073,149, filed Dec. 1, 2022; 14 pgs.

* cited by examiner

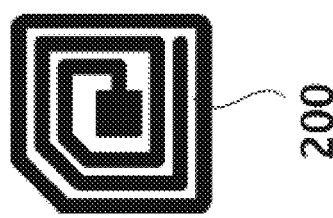
Fig. 1
IS
TS
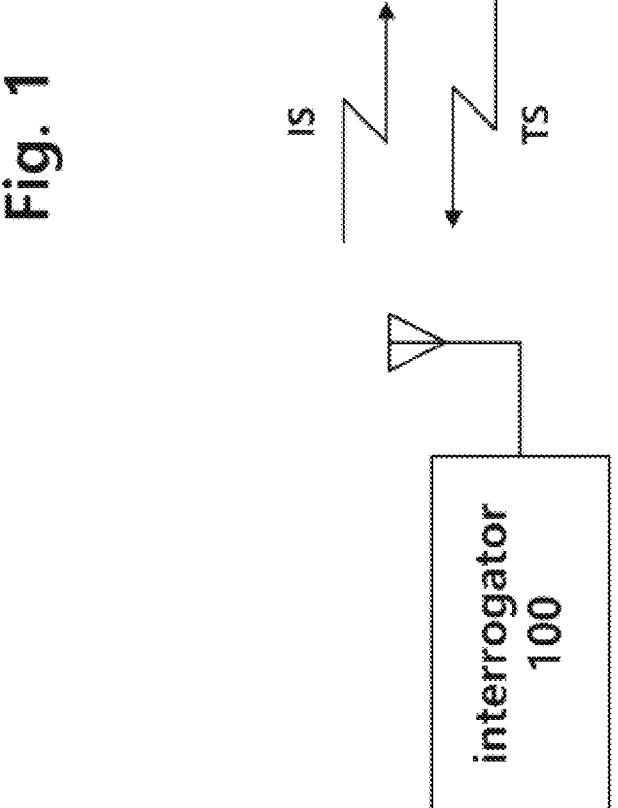
interrogator
100
10

↑ Inter-chirp phase continuity

Normalized power(dB) Angle(°)

COMMUNICATION DEVICE

CROSS-REFERENCE TO RELATED APPLICATION

This application claims priority to and the benefit of Korean Patent Application No. 10-2021-0171342, filed on Dec. 2, 2021, Korean Patent Application No. 10-2022-0066611, filed on May 31, 2022, the disclosure of which is incorporated herein by reference in its entirety.

BACKGROUND

Field of the Invention

The present technology relates to a communication device.

Discussion of Related Art

As the number of Internet of Things (IoT) devices deployed by 2035 with the goal of massive machine-type communications (mMTC) is expected to grow to a maximum of 1 trillion, massive connectivity has long been considered as a key to the success of the IoT and various future services.

Backscatter is an attractive option for large-scale networking, and low-power operation provides long-term sustainability. Further, the abundant spectral resources of millimeter waves (mmWave) covering bandwidths of up to 14 GHz in a 60 GHz band of sixth generation (6G) have great potential for large-scale networks.

SUMMARY OF THE INVENTION

Backscatter networking using millimeter waves needs to overcome several difficulties. As one of these difficulties, in a millimeter wave spectrum, the power of a backscattered signal is low compared to the power of clutter noise due to ambient reflection, and thus the backscatter networking is vulnerable to errors. This, together with the signal attenuation of the backscattered signal, has a greater effect indoors where the signal is highly reflective.

As another one of the several difficulties, backscatter devices do not have access to the wide bandwidth of millimeter waves over a range of several GHz for low-cost circuitry and ultra-low-power operation and cannot share channels for simultaneous communication, and thus scalability is limited.

The present invention is intended to solve the difficulties of the related art. That is, one of objects to be solved by the present invention is directed to providing a communication method using backscattering.

According to an aspect of the present invention, there is provided a communication device including an interrogator configured to output an interrogation signal in which unit chirp signals that vary from a first frequency to a second frequency are continuous, and backscatter tags configured to receive the interrogation signal and each provide a tag signal formed by frequency modulation on the interrogation signal, wherein the interrogator receives the tag signals and demodulates the tag signals.

The interrogator may include an interrogation signal providing unit configured to output the interrogation signal in which the unit chirp signals that vary from the first frequency to the second frequency are continuous, and a demodulation unit configured to receive and demodulate the tag signals formed by frequency modulation on the interrogation signal, wherein the interrogation signal may be a signal in which the unit chirp signals are periodically continuous and phases of the unit chirp signals are continuous.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a schematic diagram illustrating a communication device according to the present invention;

FIG. 5 is a graph schematically showing unit chirp signals included in an interrogation signal separated by a signal splitter and a tag signal received by an interrogator;

FIG. 9B is a diagram illustrating a result of measuring a beam pattern of a tag prototype with normalized power.

FIG. 11E is a drawing showing an example of the position of a backscatter tag disposed to be covered by a metal partition:

FIG. 15B is an arrangement scenario of backscatter tags:

DETAILED DESCRIPTION OF EXEMPLARY EMBODIMENTS

Hereinafter, the present invention will be described with reference to the accompanying drawings. FIG. 1 is a schematic diagram illustrating a communication device 10 according to the present invention. Referring to FIG. 1, the communication device 10 according to the present invention includes an interrogator 100 that outputs an interrogation signal IS in which unit chirp signals that vary from a first frequency to a second frequency are continuous, and one or more backscatter tags 200 that provide a tag signal TS formed by frequency modulation on the interrogation signal IS.

Figure 2:
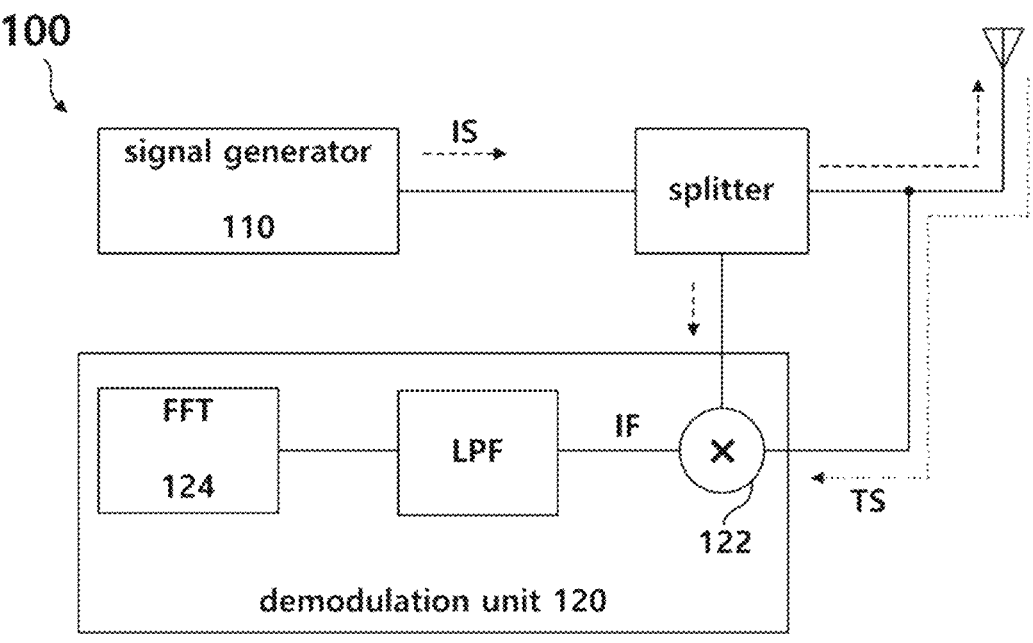
FIG. 2 is a schematic diagram illustrating an interrogator according to the present invention.

FIG. 2 is a schematic diagram illustrating the interrogator 100 according to the present invention. Referring to FIG. 2, the interrogator 100 includes a signal generator 110 that generates an interrogation signal, a signal splitter that separates a signal generated by the signal generator, and a demodulation unit 120 that demodulates a received tag signal, wherein the demodulation unit 120 includes a mixer 122 that mixes the interrogation signal and the received tag signal, and a Fourier transformer 124 that performs a Fourier transform on the mixed signals.

According to an embodiment that is not illustrated, the interrogator 100 further includes a power amplifier. The interrogation signal may be amplified by the power amplifier (not illustrated) and then transmitted through an antenna.

Figures 3A, 3B:
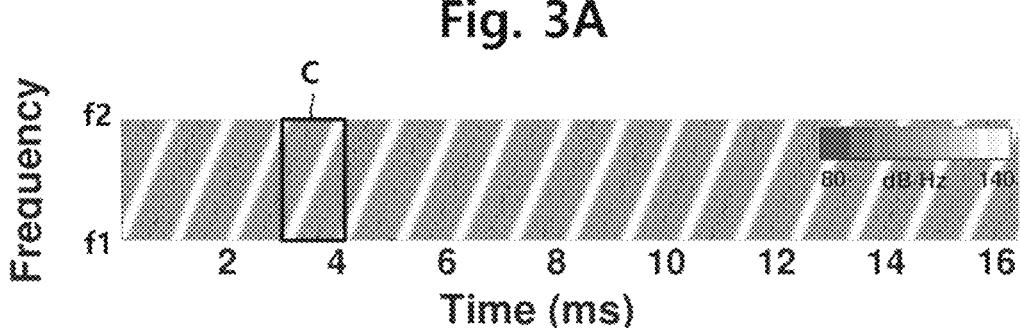
FIG. 3A is a schematic diagram illustrating a change in frequency of an interrogation signal provided by an interrogator over time.
FIG. 3B is a schematic diagram illustrating an amplitude of the interrogation signal over time.

FIG. 3A is a schematic diagram illustrating a change in frequency of the interrogation signal IS provided by the interrogator 100 over time, and FIG. 3B is a schematic diagram illustrating an amplitude of the interrogation signal IS over time. Referring to FIGS. 2, 3A, and 3B, the interrogation signal IS may be a periodic signal in which a plurality of unit chirp signals C are continuous. The unit chirp signals C may be signals that vary from a first frequency f1 to a second frequency f2.

In the illustrated embodiment, the frequencies of the unit chirp signals C are illustrated as increasing linearly from the first frequency f1 to the second frequency f2. However, according to an embodiment that is not illustrated, the frequencies of the unit chirp signals may non-linearly increase from the first frequency to the second frequency. Further, according to an embodiment that is not illustrated, the frequencies of the unit chirp signals C may linearly decrease from the first frequency f1 to the second frequency f2, and in another embodiment, the frequencies of the unit chirp signals may non-linearly decrease from the first frequency to the second frequency.

A difference between the first frequency f1 and the second frequency f2 may correspond to a bandwidth of a band to be used. In an embodiment, the first frequency f1 and the second frequency f2 may form a bandwidth of 250 MHz based on a central frequency in the 24 GHz band among millimeter wave bands of tens to hundreds of GHz frequency bands. In another embodiment, the first frequency f1 and the second frequency f2 may form a bandwidth of 14 GHz based on a central frequency of 60 GHz in the millimeter wave band. The unit chirp signals C constituting the interrogation signal IS may be connected to each other so that phases thereof are continuous as illustrated in FIG. 3B.

As will be described below, the number of the unit chirp signals C constituting the interrogation signal IS, an amount of changes in frequency of the unit chirp signals C over time, and a duration of the unit chirp signals C may be controlled according to a communication environment.

Figure 4:
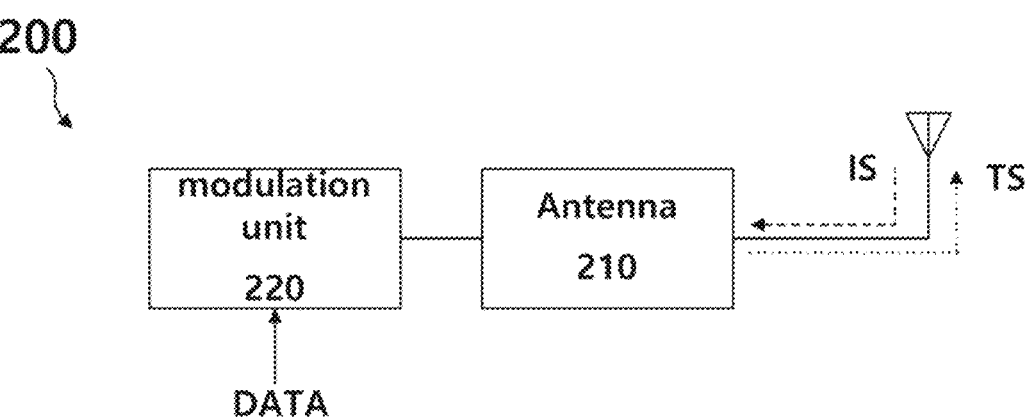
FIG. 4 is a schematic diagram illustrating a backscatter tag according to the present invention.

FIG. 4 is a schematic diagram illustrating the backscatter tag 200 according to the present invention. Referring to FIG. 4, the backscatter tag 200 includes an antenna 210) that receives the interrogation signal IS and outputs the tag signal TS, and a modulation unit 220) that modulates the frequency of the received interrogation signal IS. In an embodiment, the antenna 210 receives the interrogation signal IS and transmits the tag signal TS formed by frequency modulation on the interrogation signal with provided data. In an embodiment, the antenna 210 may be implemented as any type of antenna such as a Van Atta array, a phased array antenna, a waveguide array, and the like.

The modulation unit 220 may modulate the interrogation signal IS at a desired frequency by adjusting the impedance of the antenna through impedance switching to form the tag signal TS. As an example, the backscatter tag 200 may modulate the interrogation signal IS at a frequency fm by performing impedance switching to form the tag signal TS.

In an embodiment, the backscatter tag 200 may be included in an Internet of Things (IoT) device (not illustrated), and the frequency of the interrogation signal IS may be modulated with data DATA collected by the IoT device so that the interrogation signal IS may be provided to the interrogator 100. The IoT device (not illustrated) may include an energy harvesting device, and may drive the backscatter tag 200 with power collected by the energy harvesting device.

Figure 5:
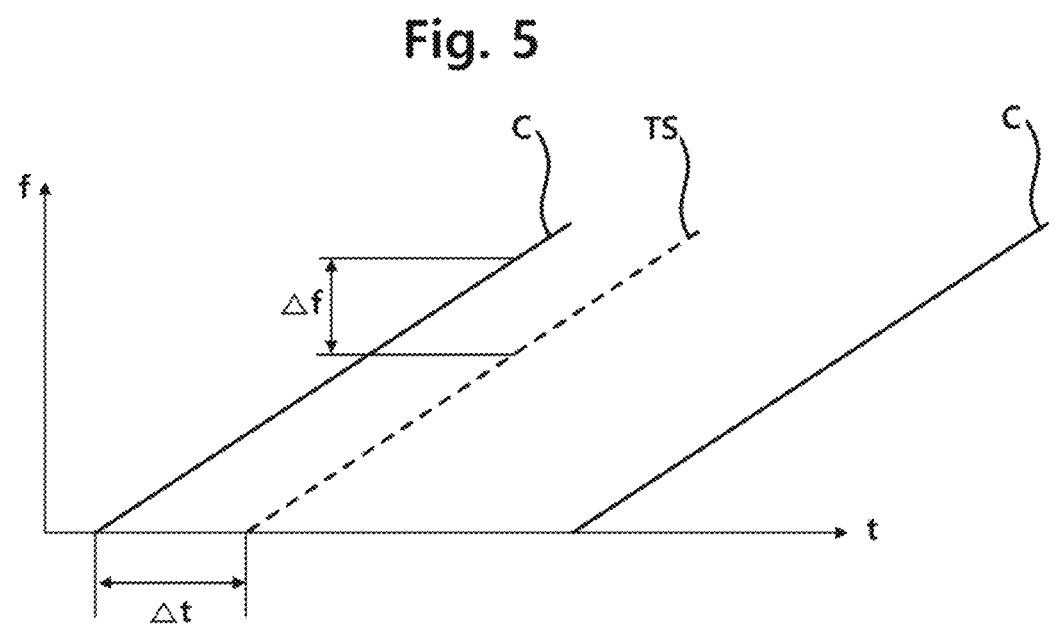

FIG. 5 is a graph schematically showing the unit chirp signals C included in the interrogation signal IS separated by the signal splitter and the tag signal TS received by the interrogator 100. Referring to FIGS. 2 and 5, the tag signal TS received by the interrogator 100 is a signal provided by reflecting the interrogation signal IS by the backscatter tag 200.

The mixer 122 receives the received tag signal TS and the interrogation signal IS separated by the signal splitter, and mixes the two signals to form an intermediate signal IF. The intermediate signal IF is formed by the product of the tag signal TS and the interrogation signal IS, and may be separated into a signal having a frequency component corresponding to the sum of the frequencies of the two signals and a signal having a frequency component corresponding to a difference in frequencies between the two signals.

The signal having a frequency component corresponding to the sum of the frequencies of the tag signal TS and the interrogation signal IS is blocked by a lowpass filter (LPF). However, only the signal having a frequency component corresponding to a frequency difference between the tag signal TS and the interrogation signal IS is provided to a subsequent Fourier transformer 124. In an embodiment, the Fourier transformer 124 may perform a discrete fast Fourier transform (FFT) operation on the input signal.

Between the interrogation signal IS and the tag signal TS, there is a time difference $\Delta t$ corresponding to a moving distance of the interrogation signal IS and a moving distance of the tag signal TS. As the time difference $\Delta t$ increases, a frequency difference $\Delta f$ of the two signals increases. That is, it can be seen that the frequency of the tag signal TS received and modulated by the interrogator 100 includes a frequency component corresponding to the distance between the interrogator 100 and the backscatter tag 200 as well as the frequency component modulated by the backscatter tag 200.

In the present invention, a channel may be allocated to the tag without a separate manipulation according to the distance between the backscatter tag 200 and the interrogator 100. Accordingly, frequency division multiple access without adjustment over the entire millimeter wave bandwidth is possible without incurring overhead in the backscatter tag 200 and the interrogator 100.

Figures 6A, 6B:
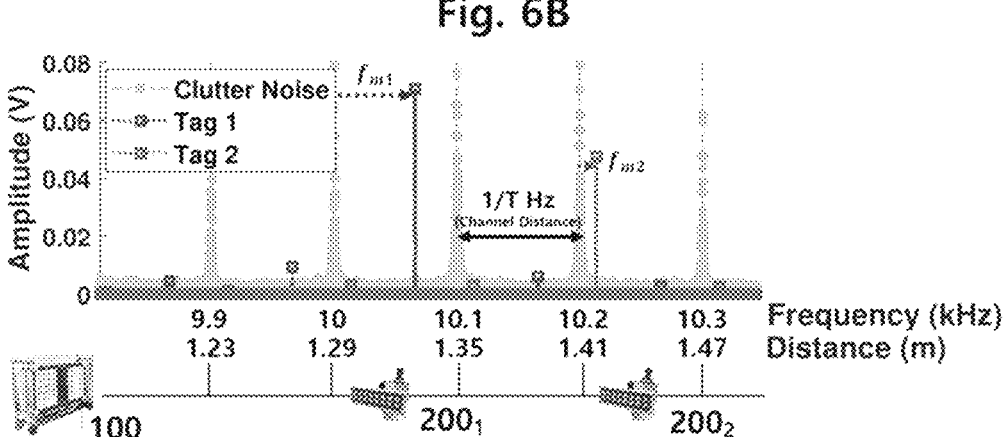
FIG. 6A is a graph showing noise bins in which clutter noise is positioned and tag bins in which tag signals are positioned in a frequency domain.
FIG. 6B is a graph showing signals reflected by two backscatter tags spaced different distances from an interrogator in a discrete frequency domain.

FIG. 6A is a graph showing noise bins NB in which clutter noise is positioned and tag bins TB in which tag signals are positioned in a frequency domain, and FIG. 6B is a graph showing signals reflected by two backscatter tags spaced different distances from the interrogator 100 in a discrete frequency domain.

Referring to FIG. 6A, as described above, the unit chirp signals C constituting the interrogation signal IS are periodic signals connected so that the phases thereof are continuous. Due to the characteristics of the Fourier transform for a periodic signal including a signal component and a noise component, the result of the Fourier transform appears in a specific frequency domain called a bin that appears in a discrete frequency domain. Among them, clutter noise appears in the noise bins NB, and a demodulated tag signal component appears in the tag bin TB. The noise bin NB and the tag bin TB do not overlap each other in the frequency domain.

In the example illustrated in FIG. 6A, two tag bins TB and one noise bin NB are periodically and repeatedly disposed. Such an example corresponds to a case in which three unit chirp signals are continuously formed to form an interrogation signal IS. That is, when N unit chirp signals are continuously formed to form an interrogation signal IS, N−1 tag bins and one noise bin are formed.

The power of the clutter noise is concentrated on the noise positioned in the noise bin NB, and the power of the noise component is low in the N−1 tag bins TB. Therefore, it is possible to detect the signal with a high signal-to-noise ratio (SNR) even when the power of the signal provided by modulation by the backscatter tag 200 positioned in the tag bin TB is low.

Referring to FIG. 6B, tag signals reflected by a backscatter tag 2001 and a backscatter tag 2002 are formed in tag bins corresponding to distances between the backscatter tags and the interrogator 100. When the backscatter tag 2001 modulates the interrogation signal IS at a frequency of $f_{m1}$, the corresponding tag signal is formed by being spaced apart from the clutter noise by $f_{m1}$ in the frequency domain. Similarly, when the backscatter tag 2002 modulates the interrogation signal IS at a frequency of $f_{m2}$, the corresponding tag signal is formed by being spaced apart from the clutter noise by $f_{m2}$ in the frequency domain.

The demodulation unit 120 (see FIG. 2) blocks the signal corresponding to the noise bin NB from the output of the Fourier transformer with a filter, and finds a signal greater than the noise level among signals positioned in the frequency domain of the tag bin TB to demodulate the signal.

In the example illustrated in FIG. 6B, when the backscatter tag 200 multiplies the interrogation signal IS by a constant frequency to form a tag signal TS, the tag signal TS should ideally be expressed in one tag bin TB, but in reality; a spectral leakage phenomenon may occur and a signal may be formed in J (generally, J=4) nearby tag bins TB. All of the signals positioned in the J tag bins TB are formed by multiplying the interrogation signal IS by the same frequency, and are spaced apart from the noise bin NB by the same size. That is, all J signals formed in one tag have the same frequency difference from adjacent noise bins.

Therefore, even in a non-ideal case in which a spectral leakage is present, N FFT peaks having the same difference from the noise bin NB may be interpreted as signals from one tag rather than being interpreted as N tags.

This also happens when the tag moves. As will be described below; even when the position of the tag bin TB in the frequency domain is changed by the movement of the tag, the signal formed in the moving tag is positioned at the same frequency difference from the adjacent noise bin NB. Therefore, it is possible to trace and demodulate the tag signal even in a situation in which the backscatter tag 200 moves.

As the number of unit chirp signals included in the interrogation signal IS increases, the number of tag bins TB in which the tag signals provided by the backscatter tag 200 are positioned increases. Therefore, there is an advantage in that large-scale communication between one interrogator 100 and a plurality of backscatter tags 200 is possible.

Figure 7:
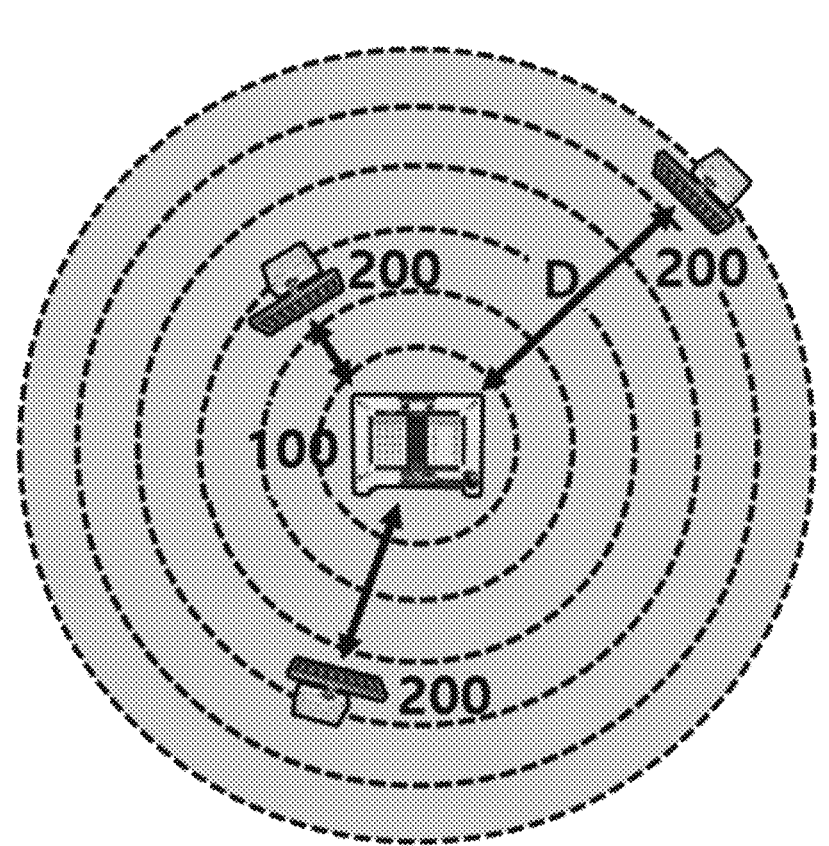
FIG. 7 is a diagram illustrating an example of channel allocation according to distances between an interrogator and backscatter tags.

FIG. 7 is a diagram illustrating an example of channel allocation according to distances between an interrogator 100 and backscatter tags 200. Referring to FIG. 7, in the present invention, channels are divided into noise bins representing a channel width of 1/T Hz (T: period of unit chirped signal) and a channel-to-channel distance in $$\frac{c}{2BW}$$

cm (BW: frequency difference of unit chirped signal, and c: speed of light). The backscatter tags 200 are allocated to the channels formed according to the distances between the backscatter tags 200 and the interrogator 100. The backscatter tag 200 modulates data using frequency-shift keying (FSK) within the channel width of 1/T Hz for channel access without information on the allocated channel, and reflects the modulated tag signal TS to provide the tag signal TS to the interrogator 100.

As described above, even when the plurality of backscatter tags 200 that modulate and reflect the interrogation signal IS at the same frequency are disposed around the interrogator 100 that provides the interrogation signal IS, when the distances between the backscatter tags 200 and the interrogator 100 are different, the frequencies of the signals received and demodulated by the interrogator 100 are different from each other.

In the present invention, according to a maximum distance D between the backscatter tags 200 and the interrogator 100, the bandwidth utilization of the millimeter wave may be performed as in the following example. As illustrated in FIG. 3A, the interrogator 100 outputs an interrogation signal in which unit chirp signals C are continuous, and the backscatter tags 200 modulate and reflect the frequencies of the corresponding unit chirp signals C. A time difference Δt is generated between the interrogation signal IS and the reflected tag signals TS as illustrated in FIG. 5.

The bandwidth may be utilized by controlling a period (duration) of the unit chirp signal and a slope of the unit chirp signal so that the time difference Δt formed in this way is positioned within the period of the chirp signal C. In this case, the period of the unit chirp signal may be calculated as $$T = \frac{2D}{c}$$

(D: maximum distance between the backscatter tags and the interrogator, c: speed of light, and T: period of the chirp signal).

Since the conventional backscattering technology has an extremely limited power budget, the backscattering devices do not have an oscillator or are equipped with a low-quality local oscillator (LO) within a range of up to several tens of MHz. Therefore, the backscatter frequency modulation has generally not been able to utilize the entire millimeter wave spectrum within a range of hundreds to thousands of MHz.

However, according to the present invention, by optimizing channel utilization, the entire bandwidth may be utilized, maximum scalability may be reached by maximizing the tag bins TB of a channel, and simultaneous communication with all nodes in a network is possible. Therefore, there is an advantage in that a wide band of millimeter waves may be utilized as a communication band between the plurality of backscatter tags 200 and the interrogator 100 in this way.

The number of channels generated by distance-based channel allocation may vary according to the bandwidth. As an example, a central frequency of 60 GHz and a bandwidth of 14 GHz may obtain a maximum of 4,600 channels for a maximum separation distance D=50 m between the backscatter tag 200 and the interrogator 100, and the number of channels is limited to 80 in the case of the central frequency of 24 GHz and the bandwidth of the 250 MHz for the same maximum separation distance.

Similarly, an inter-channel distance at which two different backscatter tags 200 should be spaced apart from each other to occupy different channels may also be changed. At the central frequency of 60 GHz, the inter-channel distance is 10.7 mm, and at the central frequency of 24 GHz, the inter-channel distance is 600 mm.

That is, the number of channels and the inter-channel distance are determined by the bandwidth and cannot be controlled, and assigning a channel to a single tag may not provide sufficient scalability for a dense network. To this end, a configurable multi-channel access mechanism between multiple tags may be required to support different scalability needs in a wide range of settings, including various spectral bands and network densities.

In the present invention, by controlling the number of unit chirp signals C included in the symbol of the interrogation signal IS, the number of tag bins TB may be freely adjusted, and multi-channel access may be performed therefrom. The increased number of tag bins TB increases scalability by providing a space for simultaneously expressing more tag signals.

The present invention provides multi-channel access without coordination by allowing the backscatter tags 200 to access a set of bins (e.g., sub-channels) with bits containing a corresponding tag identification (ID). Accordingly, it is possible to prevent signal collisions throughout the network. In the present invention, the number of unit chirp signals included in a symbol is configured such that the number of bits per symbol is larger than a tag ID space. In particular, N chirps (=log N bits per symbol) per symbol extend from 2-FSK to (N−1)/2 tags. When the number of tag bins TB increases, the symbol duration increases, resulting in lower throughput. That is, when the number of chirps increases from N to N', the throughput of the 2-FSK tag decreases by N/N'.

In the present invention, as will be described below, even when the backscatter tags 200 move, it is possible to smoothly communicate with the interrogator 100 without an essential additional design. As the backscatter tags 200 move, the distances to the interrogator 100 may change, and accordingly, the backscatter tags 200 may traverse multiple channels within a symbol duration.

Unlike the case in which the backscatter tags 200 are fixed, the moving backscatter tags 200 may have more than four spectral leaks and may extend to several channels. However, unlike the case in which the backscatter tags 200 are fixed, the interrogator 100 may expand the frequency range for demodulating the signal provided by the moving tags according to the moving speed of the backscatter tags 200 to a value greater than 4 to perform communication therewith.

Implementation Example

Figure 8A:
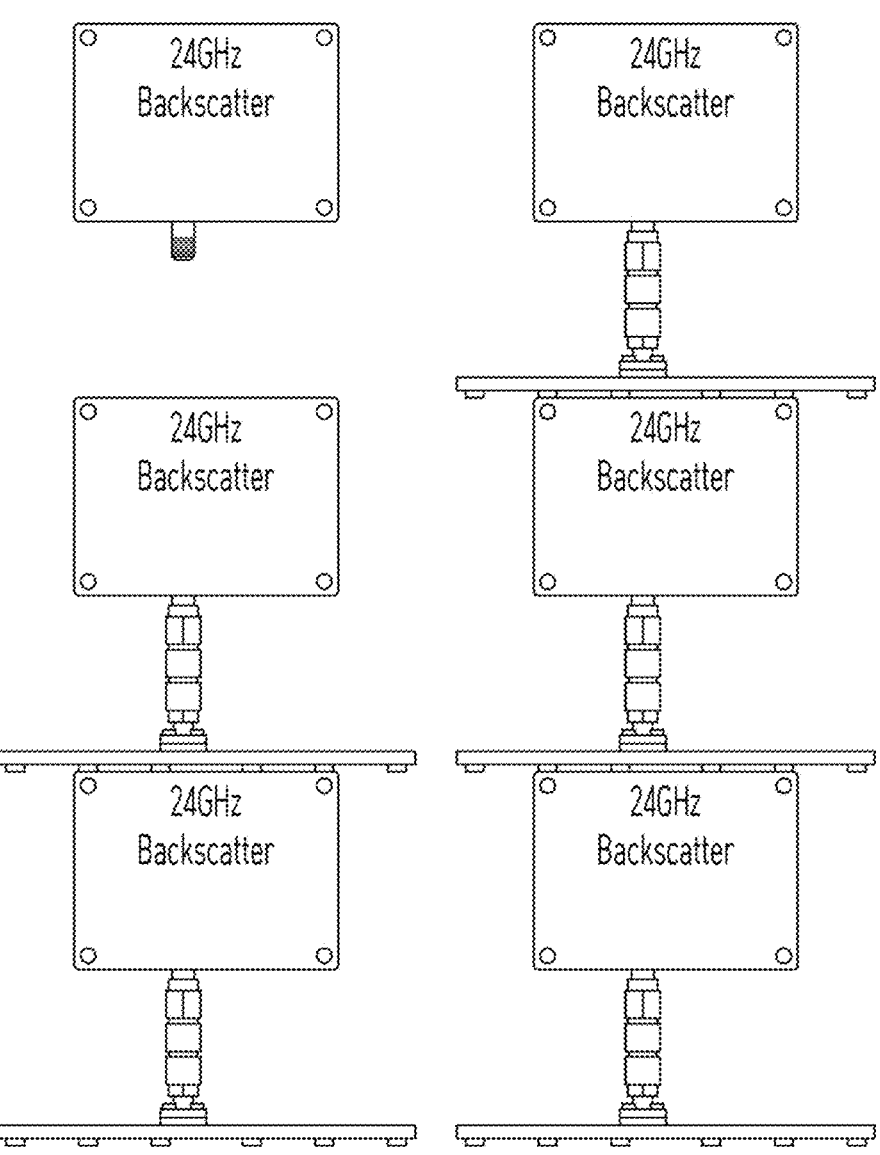
FIG. 8A is a diagram illustrating a prototype of a backscatter tag accommodated in an aluminum casing.
Figure 8B:
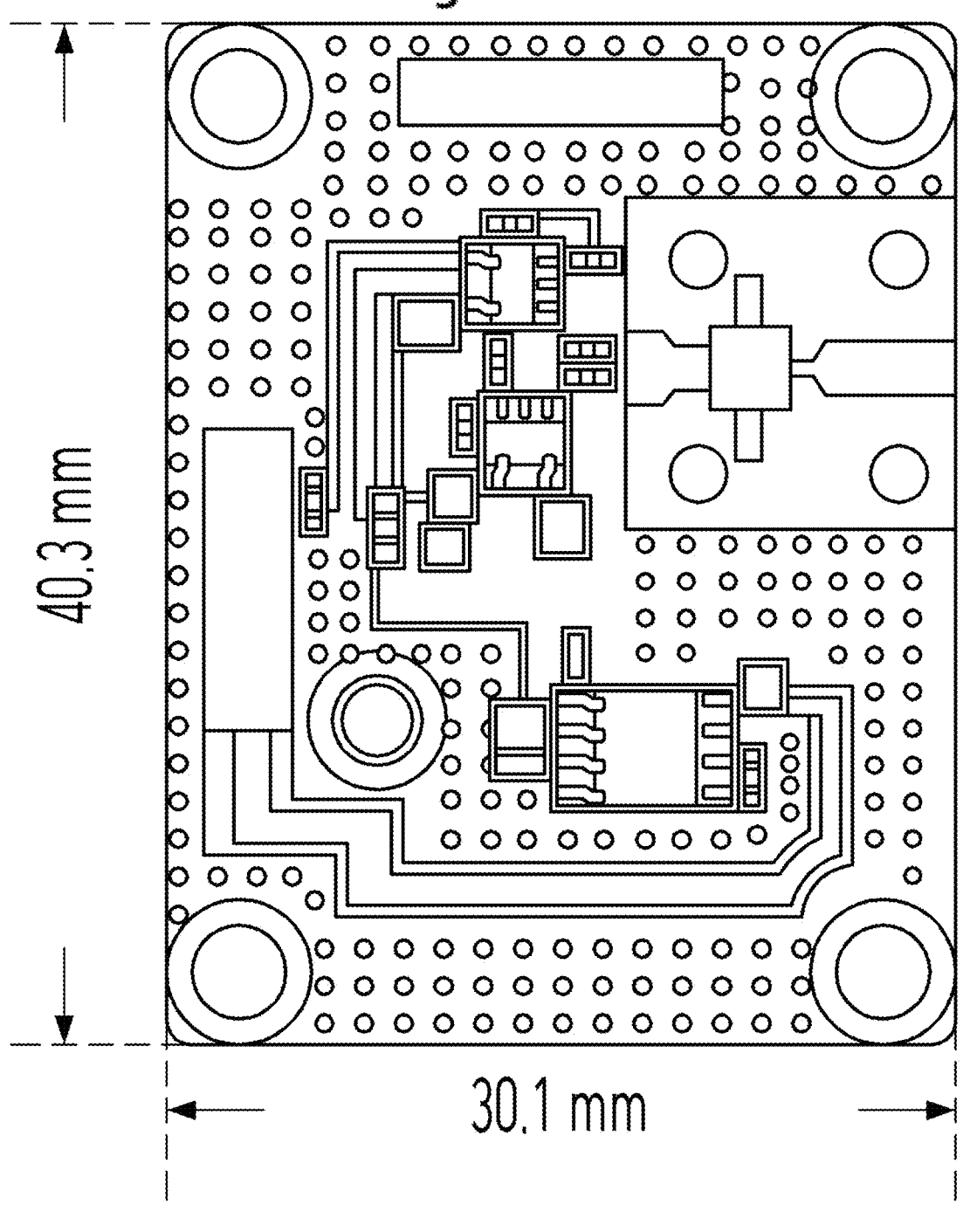
FIG. 8B is a diagram illustrating a substrate of the backscatter tag.
Figure 8C:
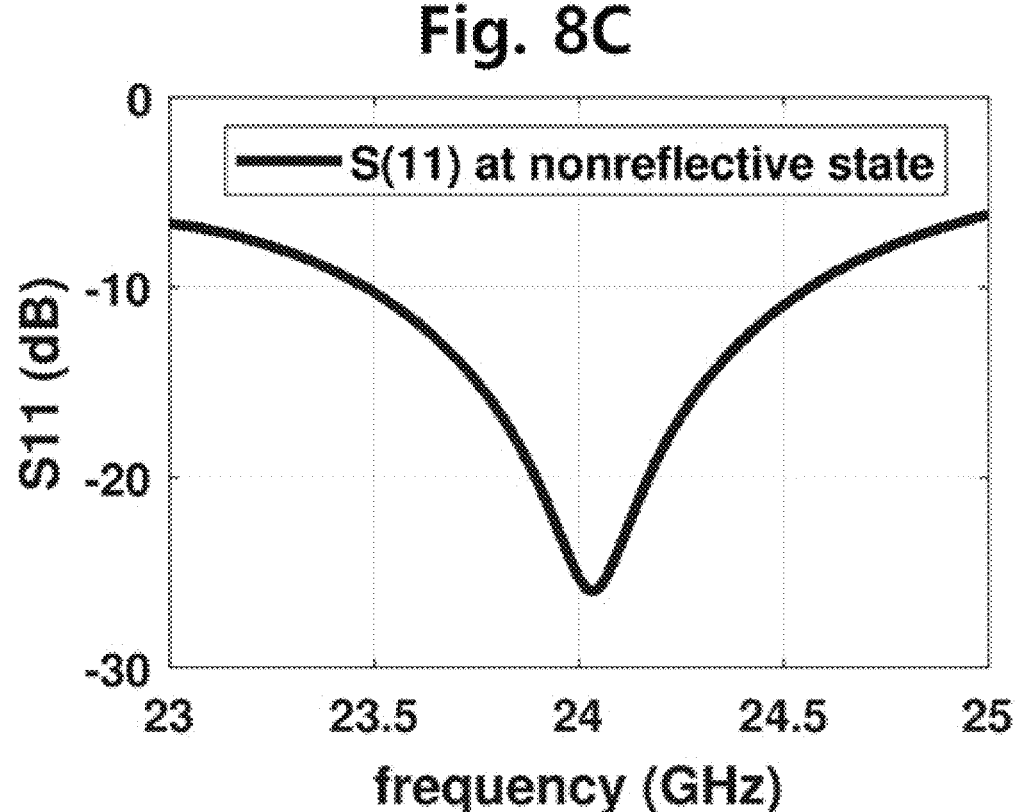
FIG. 8C is a graph showing a reflection coefficient S(11) of the substrate of the backscatter tag in a state in which a switch is closed.

FIG. 8A is a diagram illustrating a prototype of a backscatter tag accommodated in an aluminum casing, FIG. 8B is a diagram illustrating a substrate of the backscatter tag, and FIG. 8C is a graph showing a reflection coefficient S(11) of the substrate of the backscatter tag in a state in which a switch is closed. Referring to FIGS. 8A to 8C, the prototype of the backscatter tag was manufactured on a Rogers RO4003C board with a MACOM MASW-011105 GaAs SPDT RF switch. A Request for Comments (RFC) port of the switch is a 2.92 mm connector, and is connected to a commercial 24 GHz 17 dBi microstrip array antenna, and RF1/RF2 ports are each connected to 50 $2 matched ground and open (infinite impedance).

The present invention was evaluated by manufacturing a total of six tags. FIG. 8C is a graph showing a result of measuring a return loss S(11) of the tag in a non-reflecting state (i.e., ground coincidence) at 24 GHz. All backscatter tags show a flat −9.5 dB return loss in the reflected state, showing a total return loss difference of more than 20 dB between the switched states at 24 GHz. For the experiment, a tag control signal was provided to a TerasIC T-Core P0633 FPGA board powered by an Altera MAX-10 chip or an Arduino Uno. The size of the tag was 51.2 mm×41.7 mm with the tag's aluminum case, and 40.3 mm×30.1 mm without the case.

A MACOM RF switch operating at a typical power consumption of 5 μW with a separate control board was used as the prototype of the backscatter tag. For power consumption analysis, a ring oscillator and modulator circuit with a power consumption of 2 μW was used for frequency shifting and control logic, and a total of 7 μW was consumed in the backscatter tag of the present invention. Since it is known that 100 μW of power may be collected using energy harvesting, the backscatter tag of the present invention may be operated without a battery. As another example, a coin cell (1,000 mAh) battery in the form of a coin may be operated for 24.5 years.

Figure 9A:
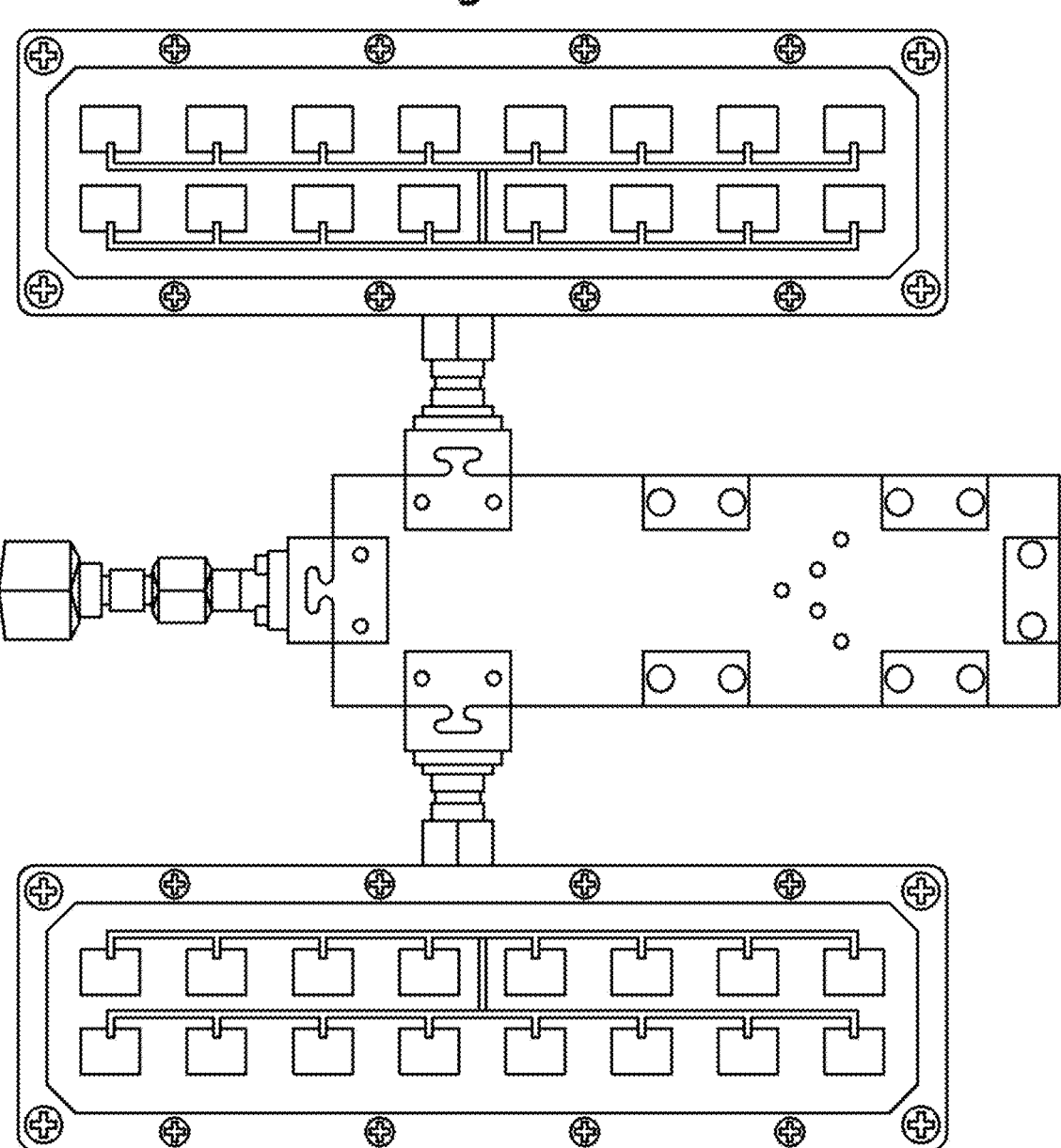
FIG. 9A is a diagram illustrating a prototype of a backscatter tag implemented as a Van Atta array.
Figure 9B:
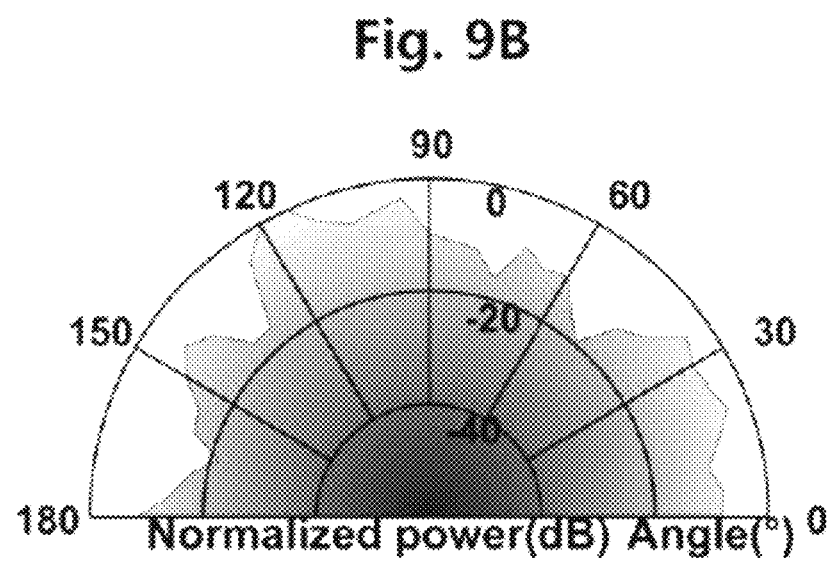
Figure 9C:
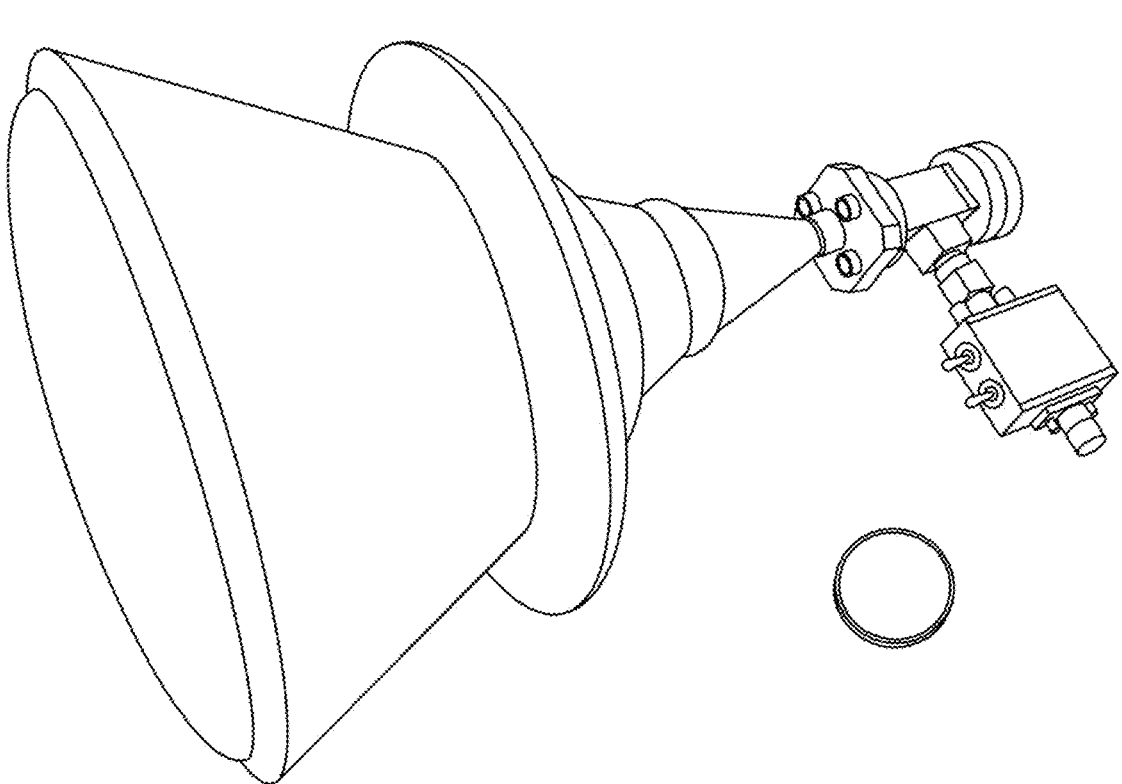
FIG. 9C is a diagram illustrating an example of a prototype of a backscatter tag implemented in an industrial, scientific and medical (ISM) band of 60 GHz.

FIG. 9A is a diagram illustrating a prototype of a backscatter tag implemented as a Van Atta array, FIG. 9B is a diagram illustrating a result of measuring a beam pattern of a tag prototype with normalized power, and FIG. 9C is a diagram illustrating an example of a prototype of a backscatter tag implemented in an industrial, scientific and medical (ISM) band of 60 GHZ. Referring to FIGS. 9A and 9B, the backscatter tag was based on an Analog Devices EVAL-ADRF5026 switch evaluation board, RFC and RF1 ports were connected to the same commercial 24 GHz antenna and the RF2 port was connected to a 50Ω matched ground. T-Core P0633 FPGA or Arduino Due was used to control a prototype tag using a Van Atta array. A pattern illustrated in FIG. 9B illustrates a retroreflection of −20 dB or more at an incidence angle of 180 degrees.

Referring to FIG. 9C, the backscatter tag was further implemented and evaluated in the 60 GHZ ISM band. As illustrated above, the 60 GHz tag was based on Eravant's V-Band Reflective SPST PIN diode switch, wherein one side of the switch was connected to Pasternack's WR-15 Waveguide Horn Antenna. The other side of the switch was connected to Eravant's WR-15 WAVEGUIDE OPEN to achieve an appropriate reflection coefficient S(11) for tag operation. T-Core P0633 FPGA or Arduino Due was used to provide a transistor-transistor logic (TTL) signal of a 60 GHz tag.

The interrogator of the present invention was implemented with a software-defined radio (SDR)-based custom reader and three commercial radars. The custom reader uses two USRP X310s for the signal transmitter and receiver. Each X310 is connected to Analog Devices' EVAL-ADMV1013 and EVAL-ADMV1014, which act as signal up-converters and down-converters for 24 GHZ RF. An external local oscillator (LO) signal at 6 GHz is supplied to the converter using a USRP B210, which is supplied to the signal mixer at a frequency of 24 GHz via an internal quadrupler on the converter board. The SDR was implemented as an interrogator by generating and processing a continuous phase chirped signal.

A 24 GHz reader was implemented using Infineon's Distance2Go and Analog Devices' EVAL-Tinyrad, which are commercial radars, and a 60 GHz reader was implemented using a set of TI mmWaveICBoost, IWR6843ISK, and DCA1000EVM. All radars provide an interface to receive raw data on chirp demodulation results in real time, and provide options to customize parameters such as a duration of unit chirp signals, an interval between unit chirp signals, a bandwidth of unit chirp signals, and transmission power.

In order to implement the interrogator with the commercial radar, a transmission time between the chirps was accurately calculated, and the corresponding phase offset was compensated for by reconstructing the chirp data over time. Therefore, the unit chirp signal was connected using zeros in between to correctly reflect the chirp phase. It is possible to easily calculate a time difference between chirps using user-defined chirp parameters.

Evaluation

Figure 10A:
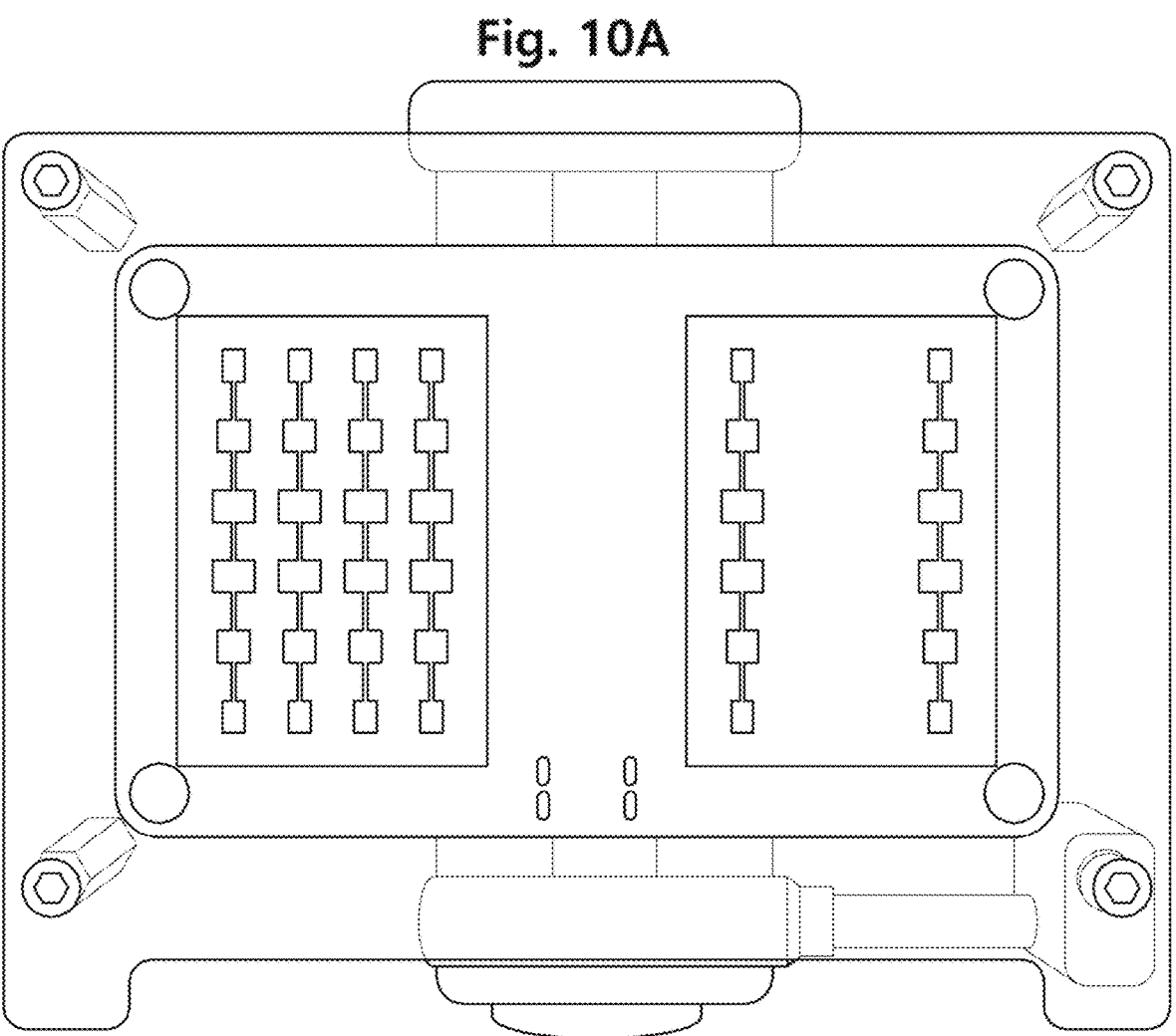
FIG. 10A is a diagram illustrating an example of a reader implementing EVAL-Tinyrad commercial radar.
Figure 10B:
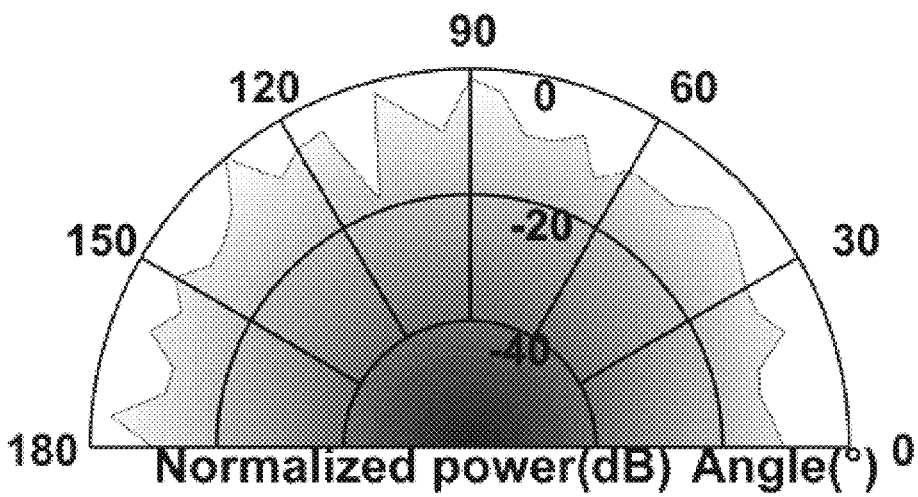
FIG. 10B is a diagram illustrating beam characteristics of an omni-directional antenna of a transmitter (TX) antenna.

FIG. 10A is a diagram illustrating an example of a reader implementing EVAL-Tinyrad commercial radar, and FIG. 10B is a diagram illustrating beam characteristics of an omni-directional antenna of a transmitter (TX) antenna. Unless otherwise specified, the present invention was evaluated using an EVAL-Tinyrad commercial radar as a reader. Referring to FIGS. 10A and 10B, the radar was set to use a single Tx antenna and a single Rx antenna for omni-directional communication. The radar was configured to utilize a full 250 MHz bandwidth of a 24 GHz ISM band (24 to 24.25 GHZ) with a maximum transmit power of 8 dBm. A duration of the unit chirp signal, a guard time between unit chirp signals, and the number of unit chirp signals per symbol were set to 8.192 ms, 23 μs, and 32, respectively. 128 symbols from each piece of measurement data were analyzed, averaged unless otherwise specified, and evaluated using a prototype tag.

Figure 11A:
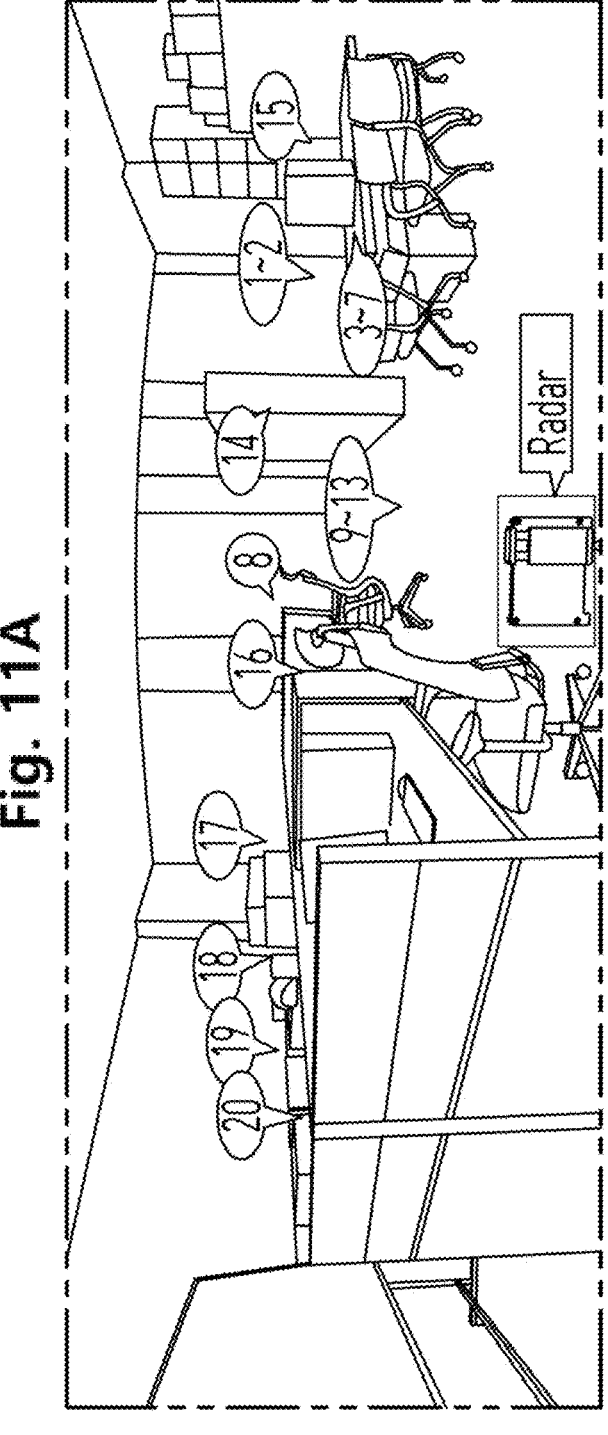
FIG. 11A is a drawing showing an example of positions of backscatter tags disposed in various positions of a 10 m×10 m office space.
Figure 11B:
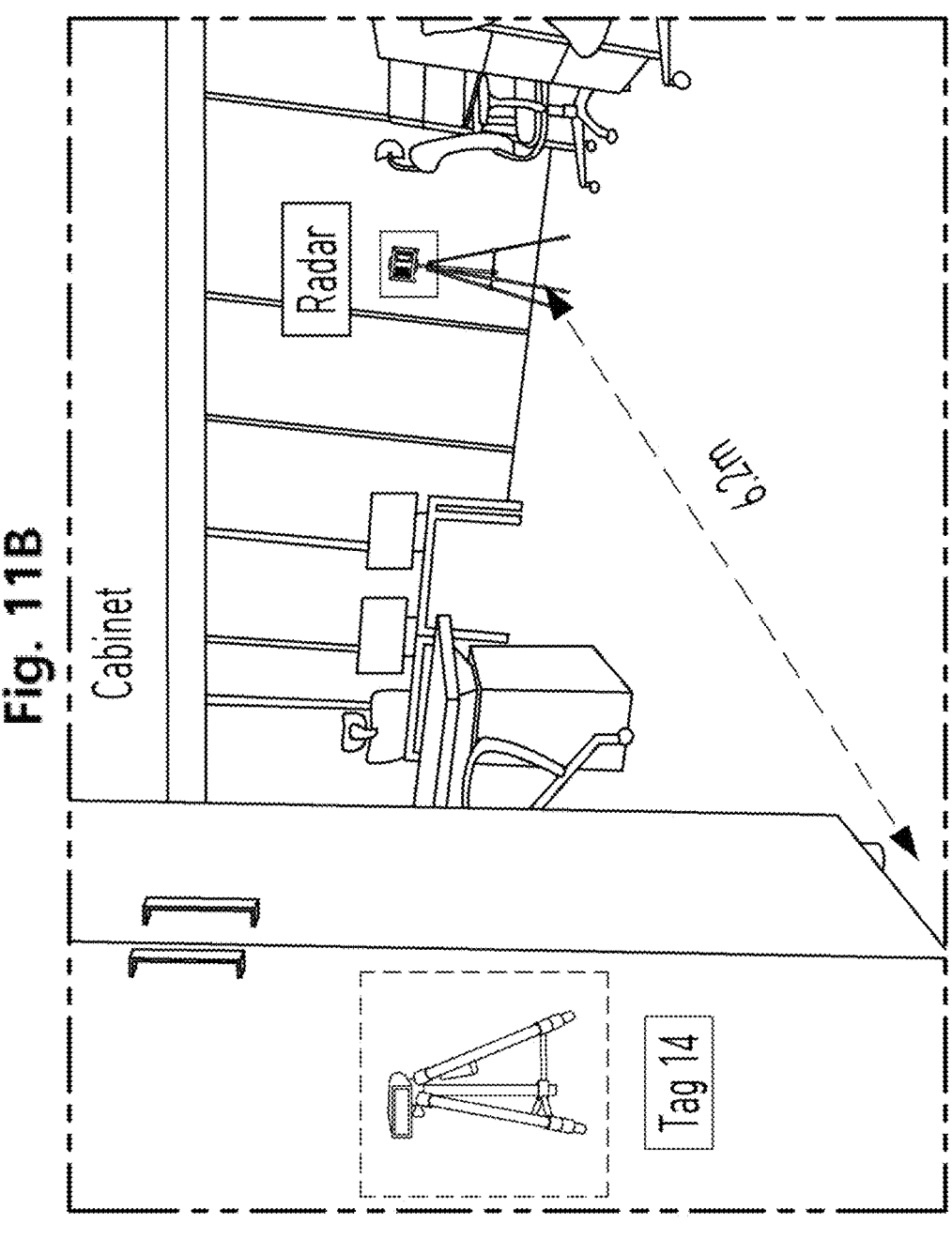
FIG. 11B is a drawing showing an example of a position of a backscatter tag disposed in a cabinet.
Figure 11C:
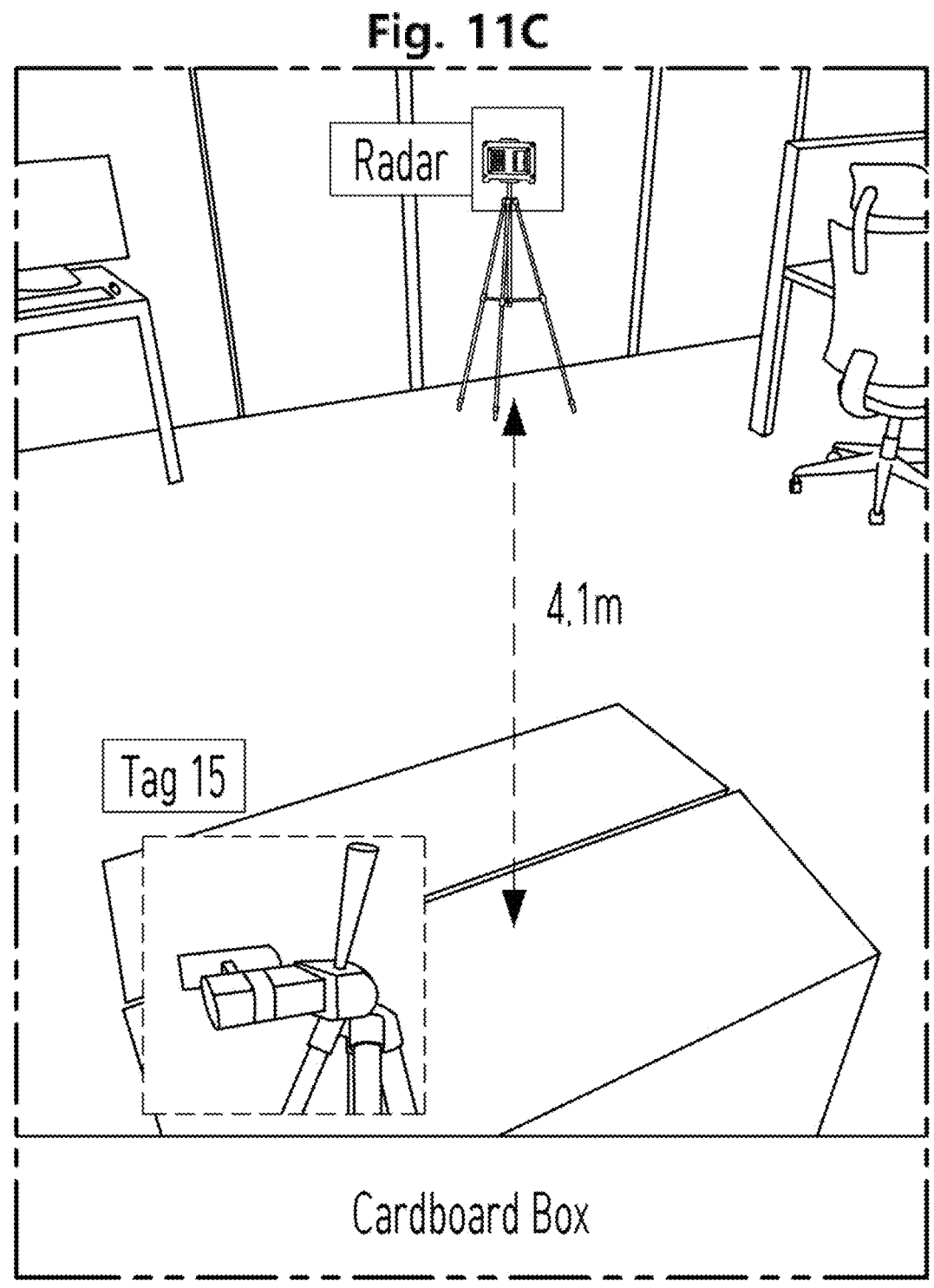
FIG. 11C is a drawing showing an example of a position of a backscatter tag disposed in a cardboard box.
Figure 11D:
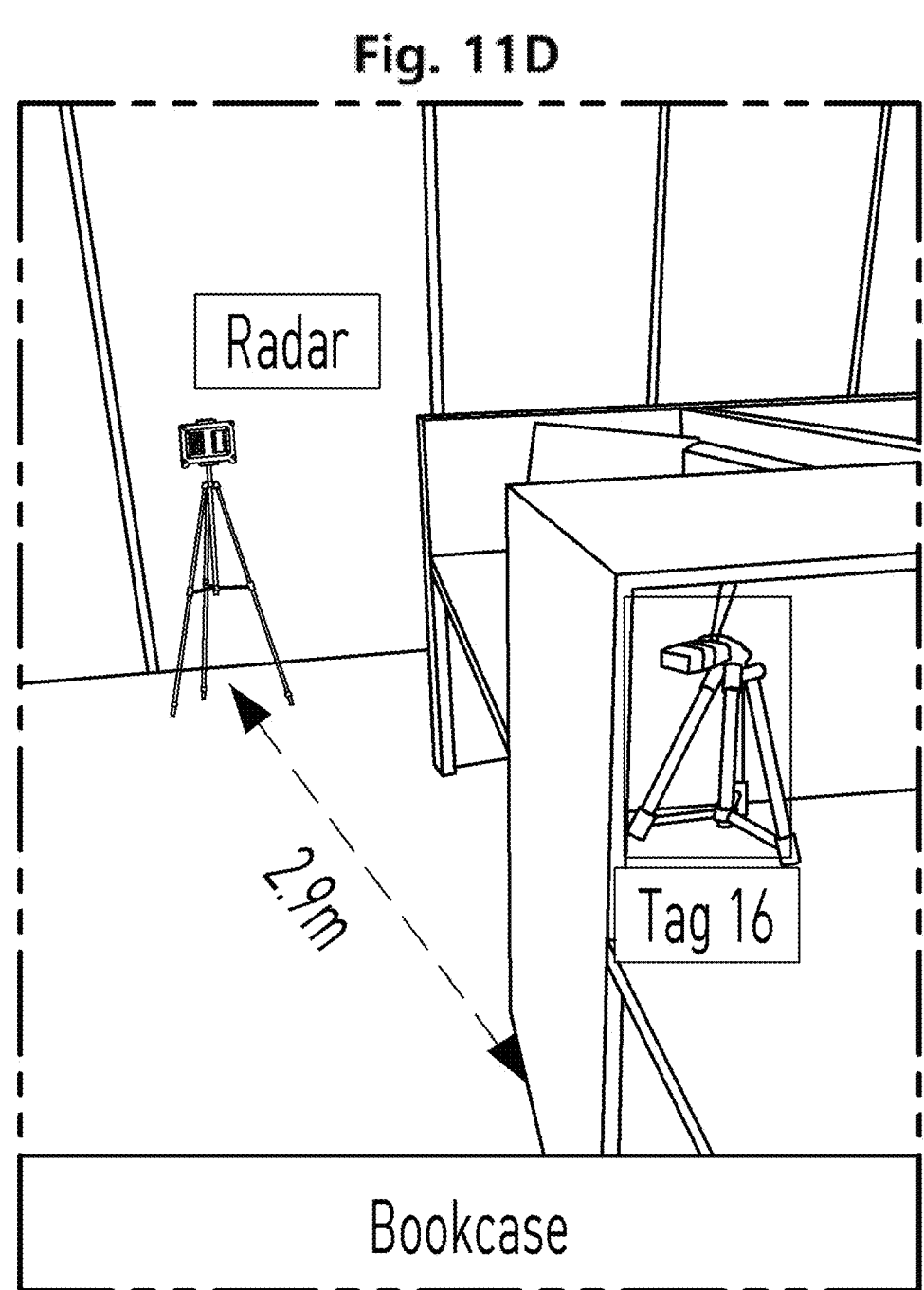
FIG. 11D is a drawing showing an example of a position of a backscatter tag disposed to be covered by a bookcase.
Figure 11E:
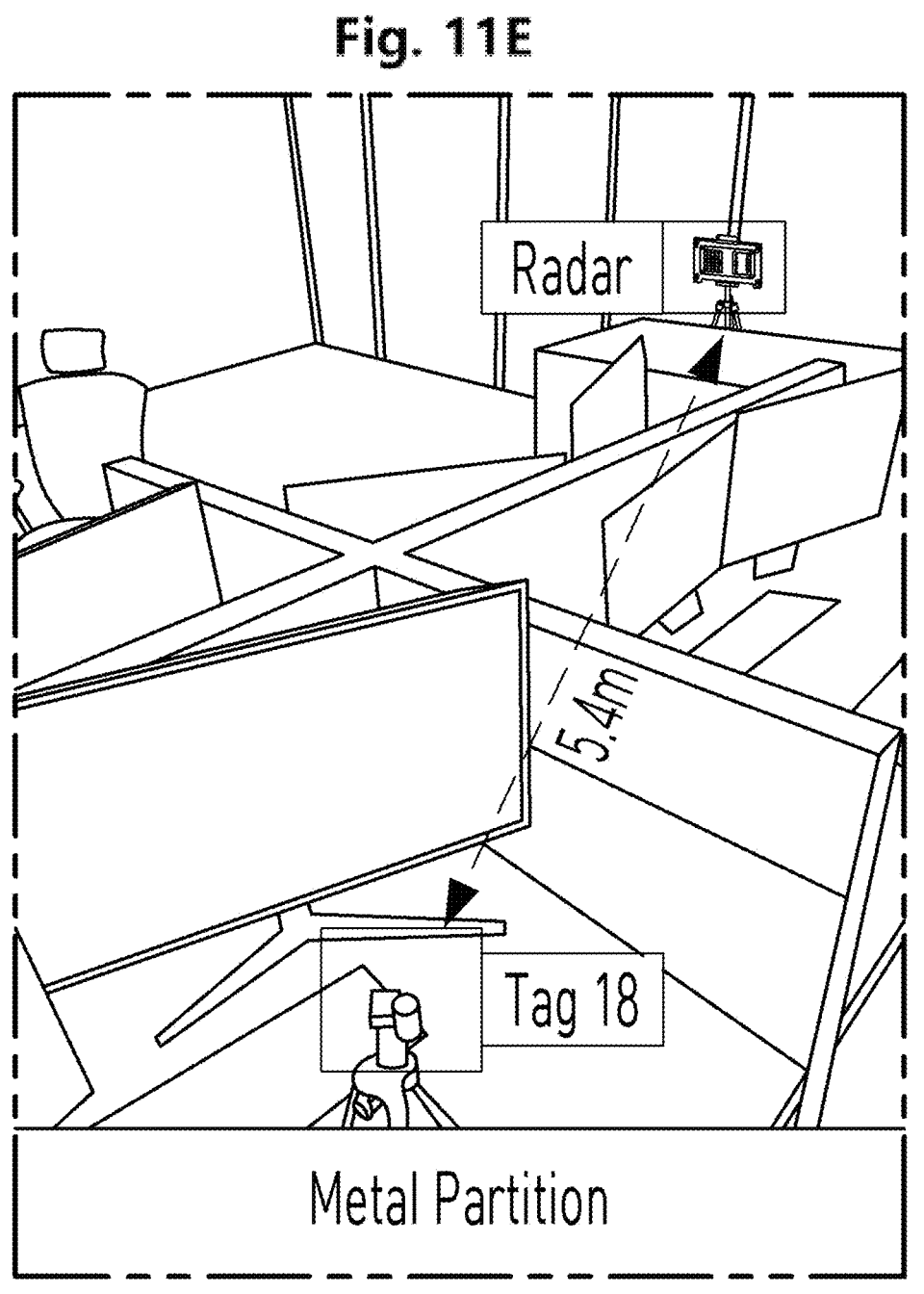
Figure 12A:
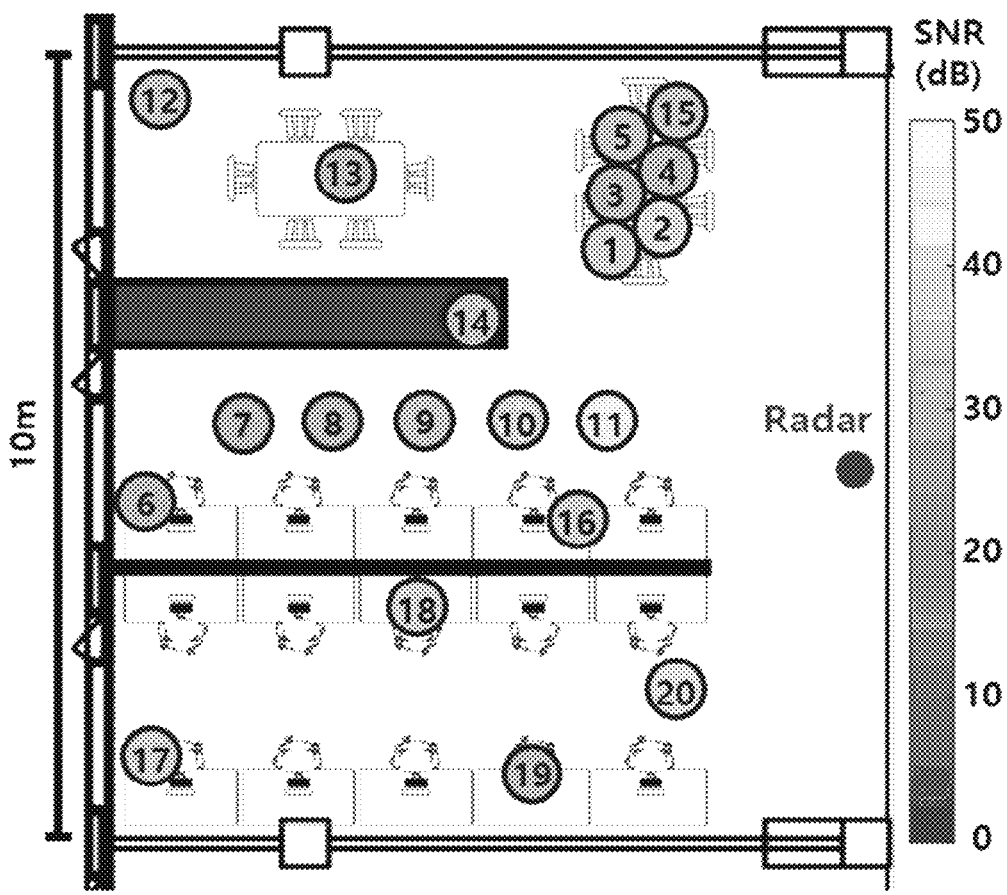
FIG. 12A is a diagram illustrating a signal-to-noise ratio (SNR) for each backscatter tag disposed in FIG. 11A.
Figure 12B:
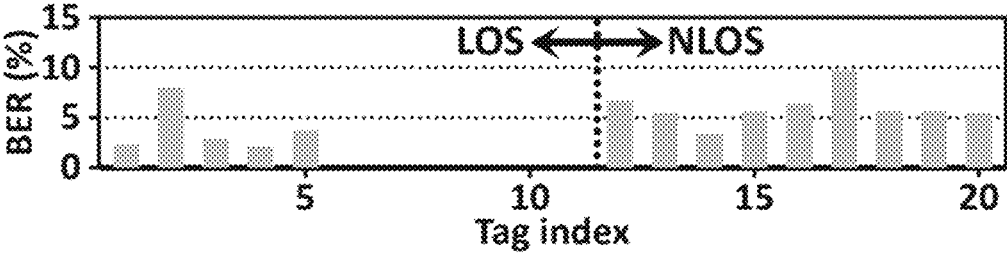
FIG. 12B is a diagram illustrating a bit error rate (BER) of a single omni-directional radar.

FIG. 11A is a drawing showing an example of positions of backscatter tags disposed in various positions of a 10 m×10 m office space, FIG. 11B is a drawing showing an example of a position of a backscatter tag disposed in a cabinet, FIG. 11C is a drawing showing an example of a position of a backscatter tag disposed in a cardboard box, FIG. 11D is a drawing showing an example of a position of a backscatter tag disposed to be covered by a bookcase, and FIG. 11E is a drawing showing an example of the position of a backscatter tag disposed to be covered by a metal partition. FIG. 12A is a diagram illustrating an SNR for each backscatter tag disposed in FIG. 11A, and FIG. 12B is a diagram illustrating a bit error rate (BER) of a single omni-directional radar.

Among the positions of all the backscatter tags in FIG. 11A, up to 4 positions were repeatedly selected and evaluated with the backscatter tags modulated at 150, 152, 154, and 156 kHz. The backscatter tags transmitted data at the same time, and the measured SNR was the same as the SNR heat map of FIG. 12A and the BER graph of FIG. 12B. The direction and position of the radar were not changed during the test. As a result, the SNR of the entire office was 20 dB or more and the BER was less than 10%, the performance of the present invention was proved, and from this, the high practicality of the present invention was proved. That is, according to the present invention, it can be seen that the tags can be arbitrarily arranged and communication of all tags in the office can be sufficiently supported using a single antenna commercial radar.

Figures 13A, 13B:
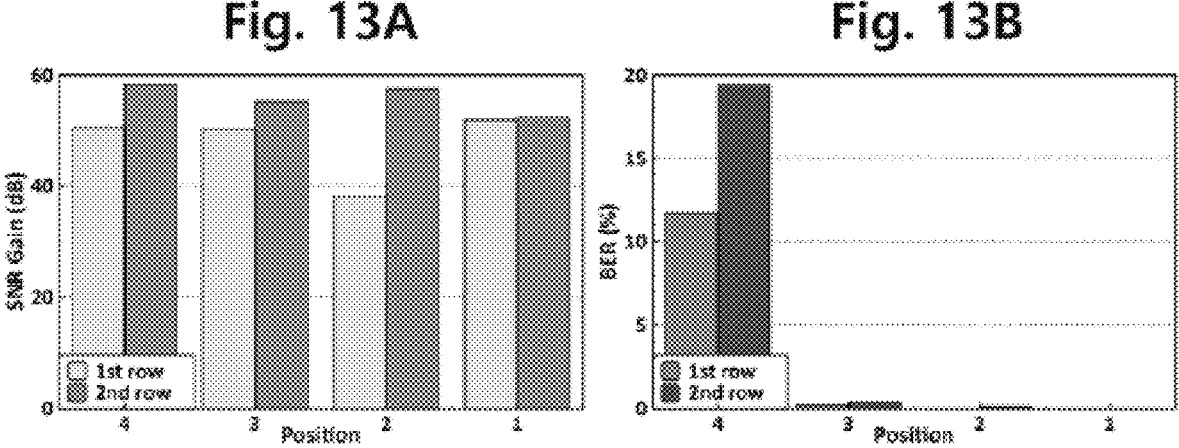
FIG. 13A is a graph showing SNRs measured for each backscatter tag in a state in which the communication device according to the present invention is disposed in a university library and an interrogator and back scattering tags are disposed to be covered by shelves.
FIG. 13B is a graph showing BERs measured for each backscatter tag in a state in which the communication device according to the present invention is disposed in the university library and the interrogator and the back scattering tags are disposed to be covered by the shelves.
Figure 13C:
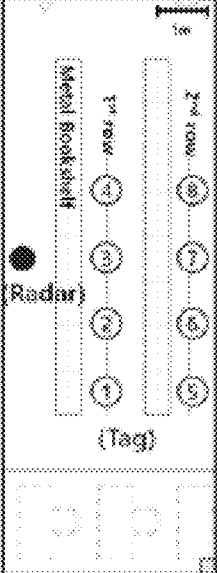
FIG. 13C is a plan view illustrating the arrangement state.
Figure 13D:
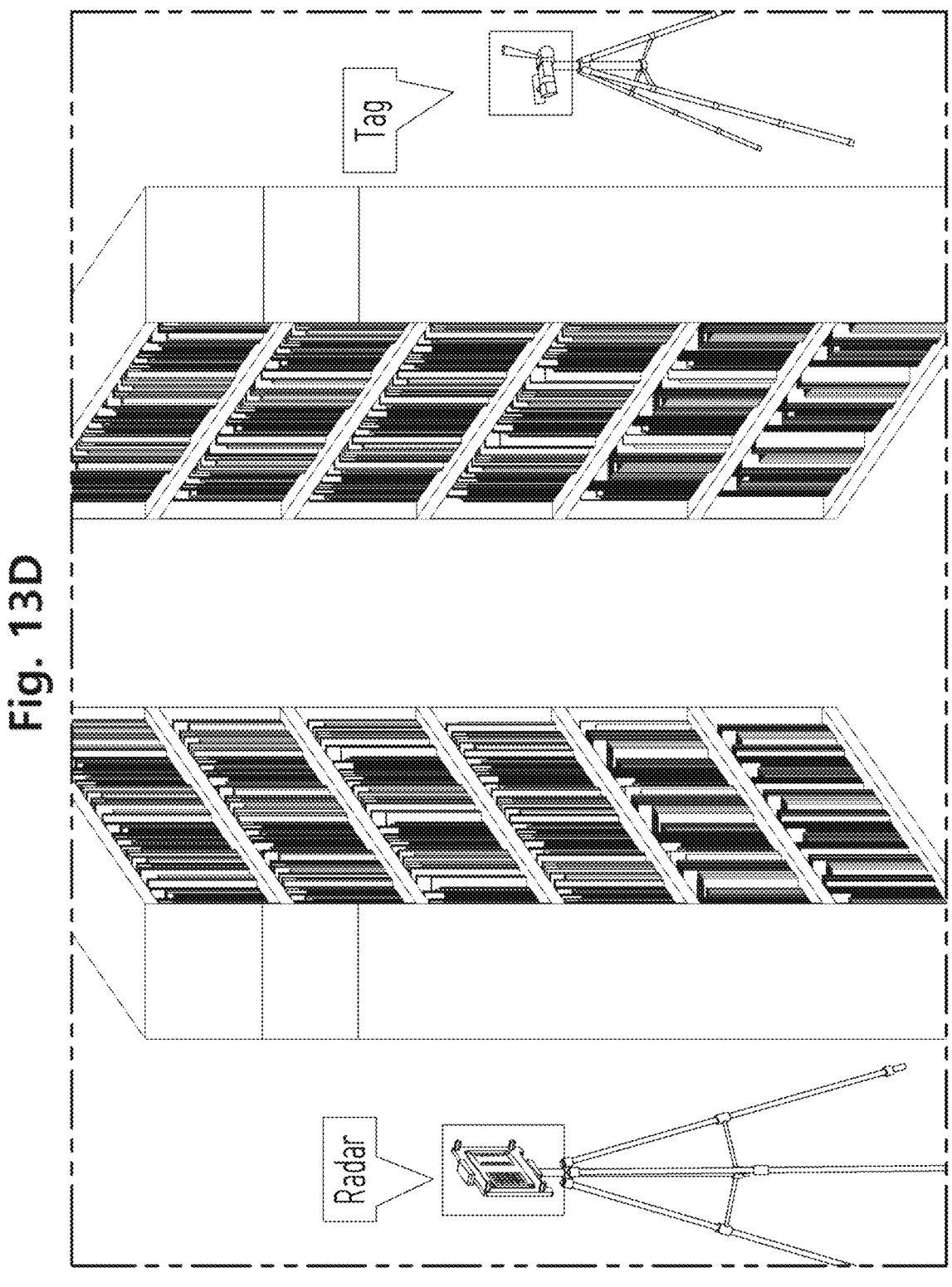
FIG. 13D is a drawing showing the arrangement state.

FIG. 13A is a graph showing SNRs measured for each backscatter tag in a state in which the communication device according to the present invention is disposed in a university library and an interrogator and back scattering tags are disposed to be covered by shelves, FIG. 13B is a graph showing BERs measured for each backscatter tag in a state in which the communication device according to the present invention is disposed in the university library and the interrogator and the back scattering tags are disposed to be covered by the shelves, FIG. 13C is a plan view illustrating the arrangement state, and FIG. 13D is a drawing showing the arrangement state.

The experiment was conducted in a library with a wooden box and iron shelves filled with books between the interrogator and the backscatter tags as illustrated in FIGS. 13C and 13D. A thickness of each metal shelf was 50 cm and an interval between the metal shelves was 124 cm. As illustrated, a total of eight positions were tested with a tag with a modulation frequency of 10 kHz. Four positions in each row were 135 cm apart in a direction parallel to the shelves. The SNR and BER measured at the eight tag positions are as shown in FIGS. 13A and 13B.

As illustrated, even with two steel shelves between the tag and the radar, an average BER of 5% and an SNR gain of up to 58.4 dB could be obtained. The SNR and BER deteriorated at position points 4 and 8 with thicker blockages of the line of sight (LOS) link as the signal became more likely to hit metal poles on the shelf. Successful communication was possible even in a harsh non-line of sight (NLOS) environment, and was made possible due to the high SNR gain and clutter noise removal of the present invention. According to these experimental results, the robustness of the present invention in complex and realistic NLOS communication scenarios is verified.

Figure 14A:
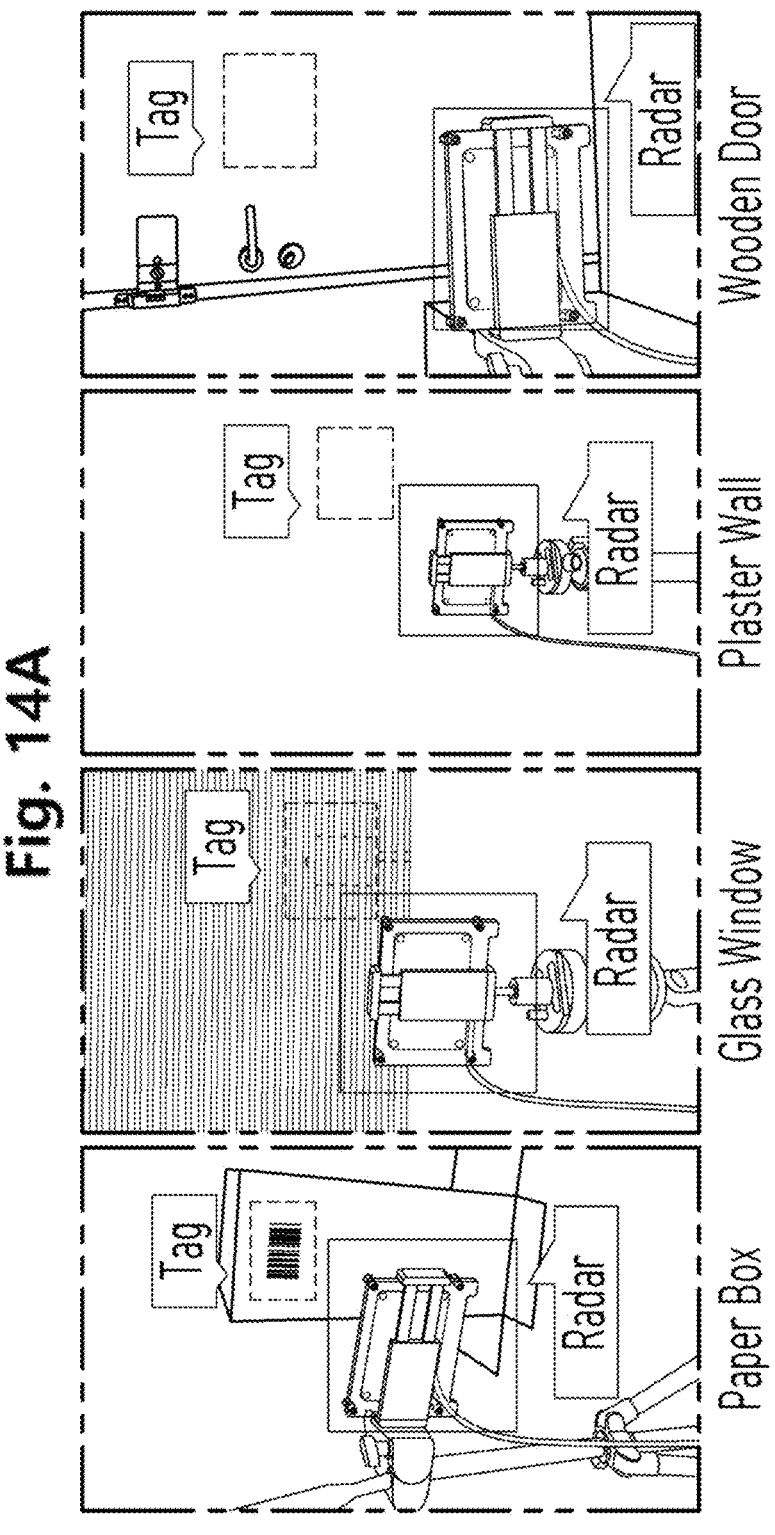
FIG. 14A are drawings showing several penetration scenarios.
Figures 14B, 14C:
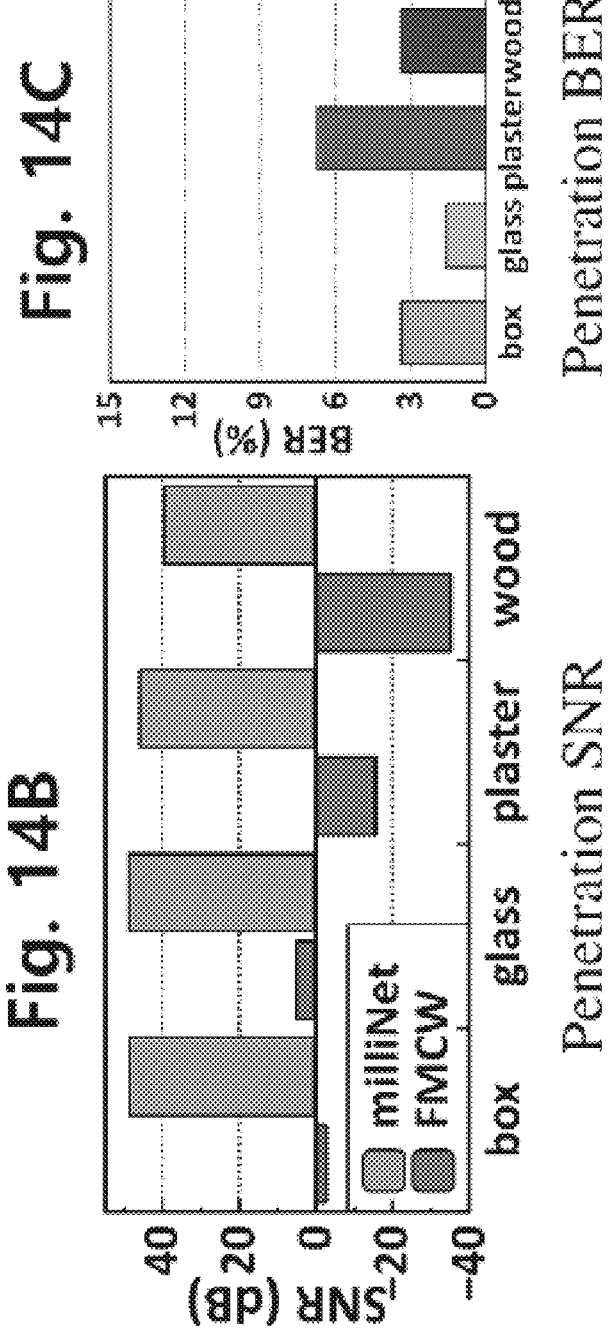
FIG. 14B is a graph showing SNRs measured for each scenario.
FIG. 14C is a graph showing BERs measured for each scenario.

FIG. 14A are drawings showing several penetration scenarios, FIG. 14B is a graph showing SNRs measured for each scenario, and FIG. 14C is a graph showing BERs measured for each scenario. Each penetration scenario is run in the environment of common indoor obstacles, such as a 0.5 cm thick paper box, a 1 cm thick glass window, a 13 cm thick plaster wall, and a 4 cm thick wooden door.

The backscatter tag is completely closed by an obstacle, and the only way to communicate with the interrogator is to penetrate the obstacle. The backscatter tag performs modulation at 156 kHz for experiments. Each experiment was performed at a distance of 122 cm between the tag and the radar. The high-efficiency clutter noise removal and SNR gain of a radar implemented as an interrogator show good SNR and BER characteristics with a high SNR gain of over 40 dB and a BER of up to 6.7% even in a clogged scenario. As a result of verifying communication stability, the possibility of communication with tags in different rooms was proven even in various blockage situations.

Figure 15A:
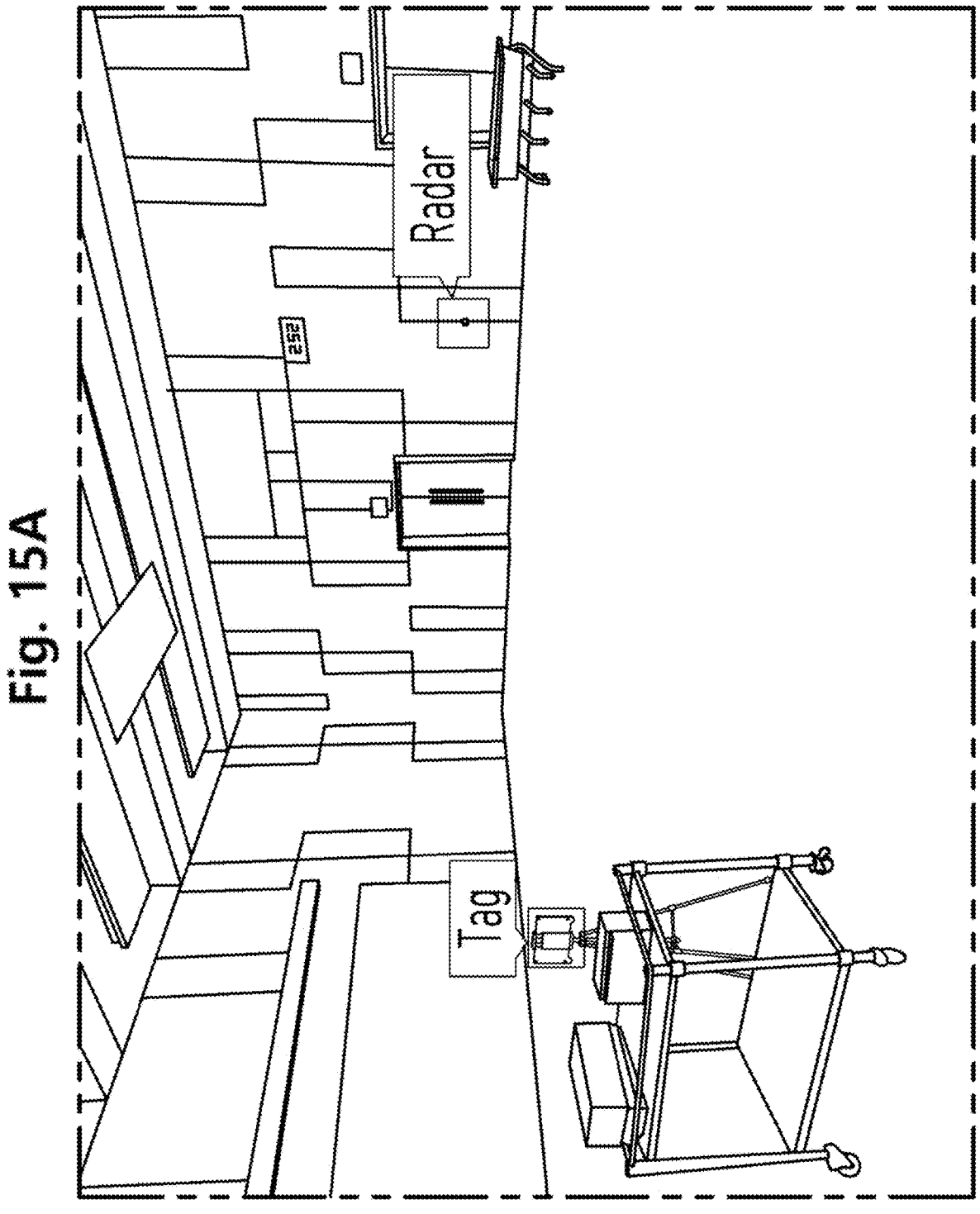
FIG. 15A is a field drawing of a 20 m×20 m size auditorium for large-scale communication experiments.
Figure 15B:
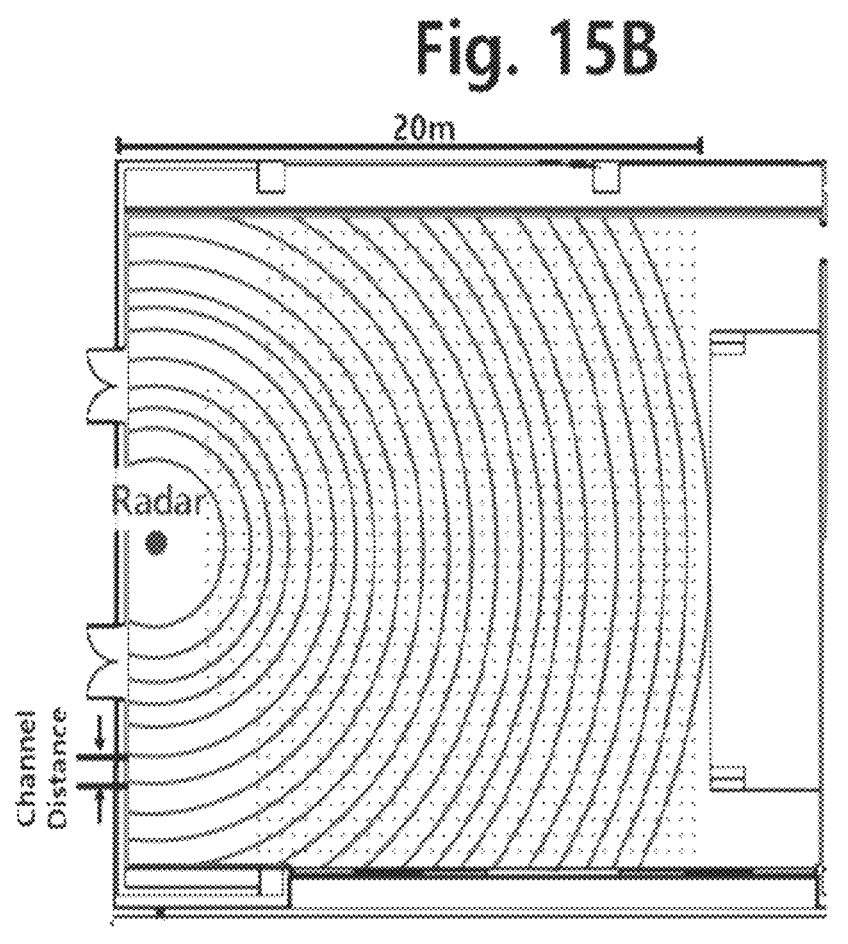

FIG. 15A is a field drawing of a 20 m×20 m size auditorium for large-scale communication experiments, and FIG. 15B is an arrangement scenario of backscatter tags. In order to confirm the large-scale communication of the present invention, as illustrated in FIG. 15A, BERs were calculated from tags positioned in 1,100 different position-frequency pairs in a 20 m×20 m auditorium. A range of lengths between the interrogator and the backscatter tags is 0.3 m to 14.1 m, and a modulation frequency range is 7315 Hz to 7414 Hz. The large-scale distribution BER was measured by summing all 1,100 signal pairs.

Figures 16A, 16B:
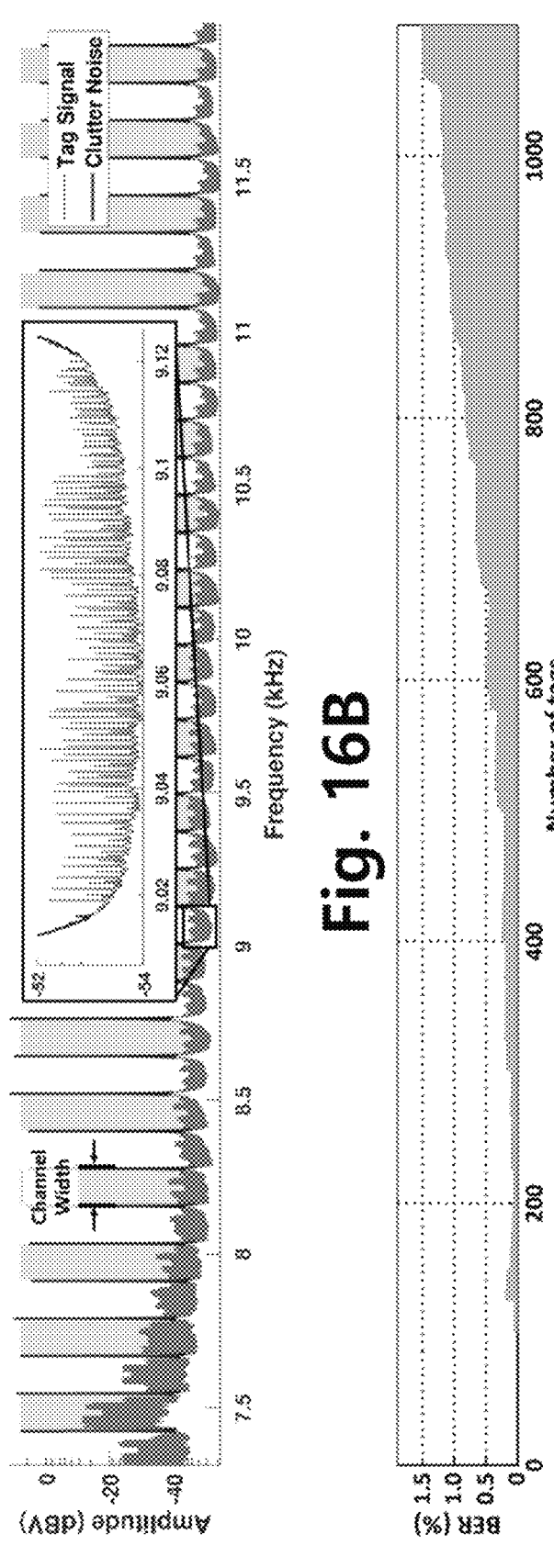
FIG. 16A is a graph showing signals of 1,100 backscatter tags by channel.
FIG. 16B is a graph showing BERs of all backscatter tags.

FIG. 16A is a graph showing signals of 1,100 backscatter tags by channel, and FIG. 16B is a graph showing BERs of all backscatter tags. Referring to FIGS. 16A and 16B, FIG. 16A shows the demodulation result in the summed signal partially enlarged, and it can be seen that the backscatter tags according to the present invention are positioned in different channels according to the distance-based frequency division multiple access. However, some tags share channels with other tags.

FIG. 16B shows the aggregated BERs after summing the signals with respect to the number of aggregated tags. The tag signals are summed in order of increasing distance. The demodulation result with a BER of less than 2% for all 1,100 tag signals indicates the possibility of large-scale communication. It can be seen that the added tags increase as the number of tags to which the summed BERs are added increases because the communication distance increases and the noise increases. Further, it should be noted that, as the signals are summed, additive white Gaussian noise (AWGN) is also added, resulting in more severe conditions. Even in such a case, the interrogator of the present invention was able to successfully demodulate all the signals. The above is achieved by the clutter noise removal and large-scale networking channel allocation design of the present invention, and in fact, the backscatter tags can be expected to be able to operate on a large-scale with improved SNR.

Figure 17A:
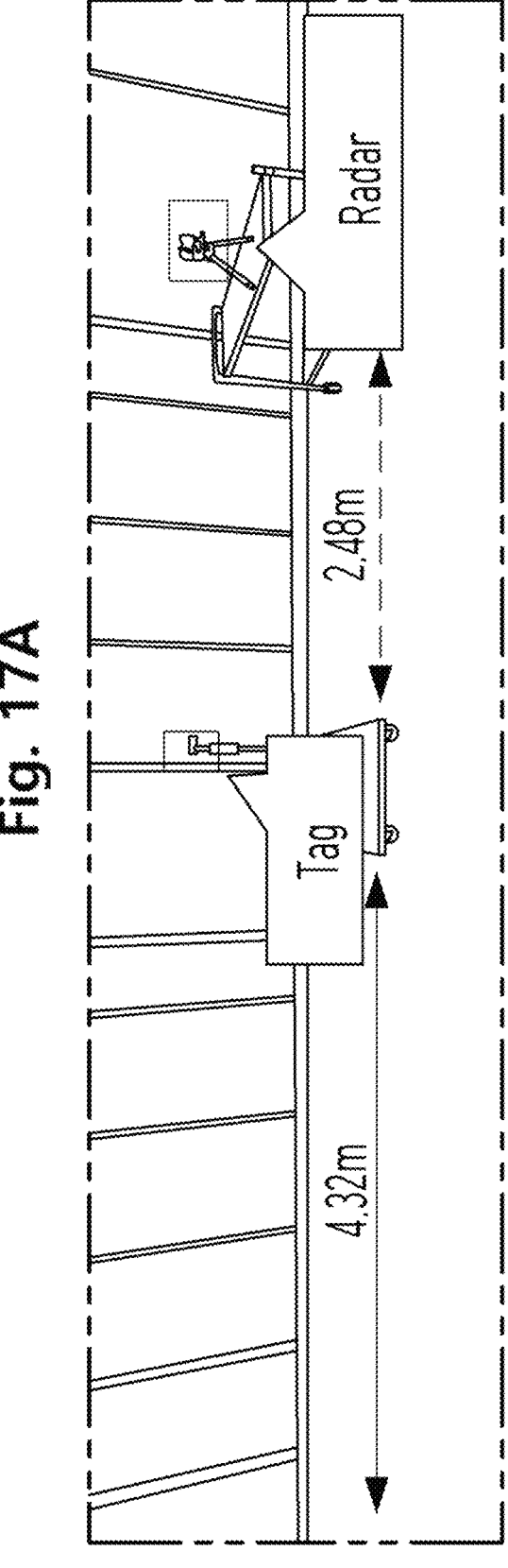
FIG. 17A is a drawing showing a path when a backscatter tag moves horizontally from an interrogator.
Figures 17B, 17C:
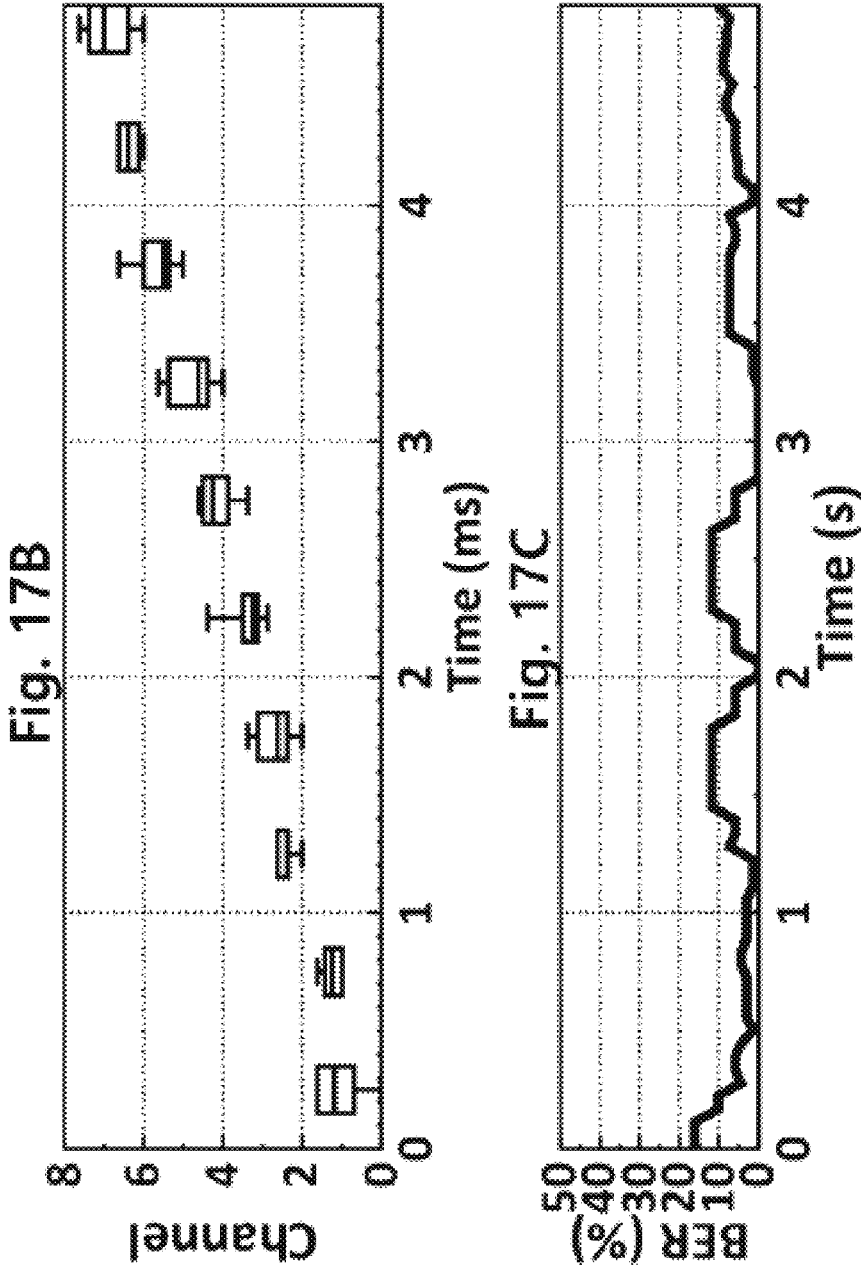
FIG. 17B is a graph showing a channel when the backscatter tag moves horizontally from the interrogator.
FIG. 17C is a graph showing a BER when the backscatter tag moves horizontally from the interrogator.

FIG. 17A is a drawing showing a path when a backscatter tag moves horizontally from an interrogator, FIG. 17B is a graph showing a channel when the backscatter tag moves horizontally from the interrogator, and FIG. 17C is a graph showing a BER when the backscatter tag moves horizontally from the interrogator. Further, FIG. 18A is a drawing showing a path when a backscatter tag moves vertically from an interrogator, and FIG. 18B is a graph showing a BER when the backscatter tag moves vertically from the interrogator.

Referring to FIGS. 17A to 18B, since the present invention does not require beamforming in the interrogator, the signal reflected by the movable backscatter tag may be successfully detected and demodulated. The experiment in the mobility environment was evaluated by analyzing a total of 1,664 symbols by setting the number of chirps per symbol to 8. FIG. 17A illustrates a simple indoor mobility experiment in which the tag moves horizontally in a straight line 4.15 m at a minimum distance of 3 m from the radar. Measurements were made for 13.7 seconds moving at 0.3 m/s. FIG. 17B illustrates the BER over time, and the average BER during movement was 6.4%.

Figure 18A:
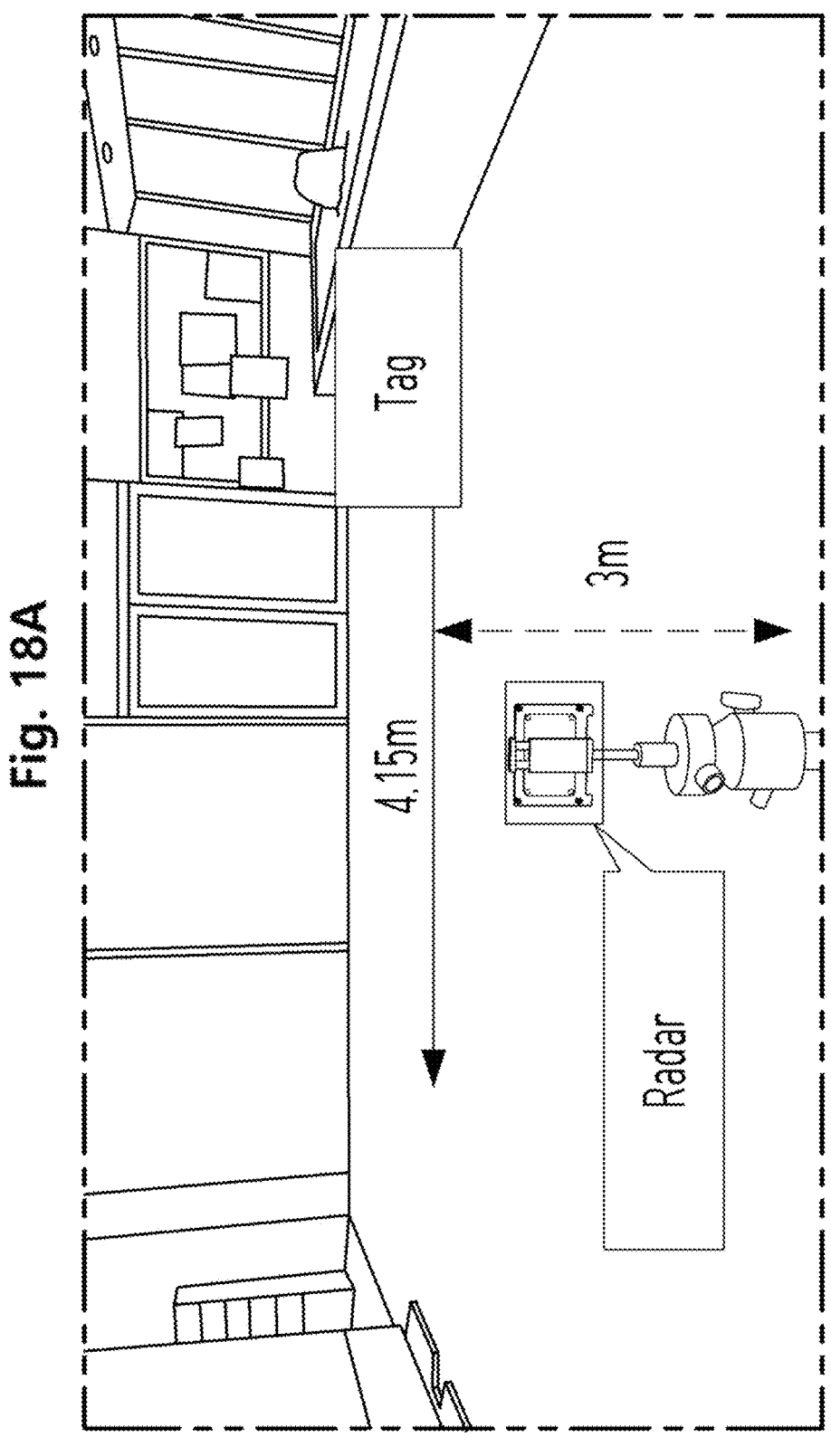
FIG. 18A is a drawing showing a path when a backscatter tag moves vertically from an interrogator.
Figure 18B:
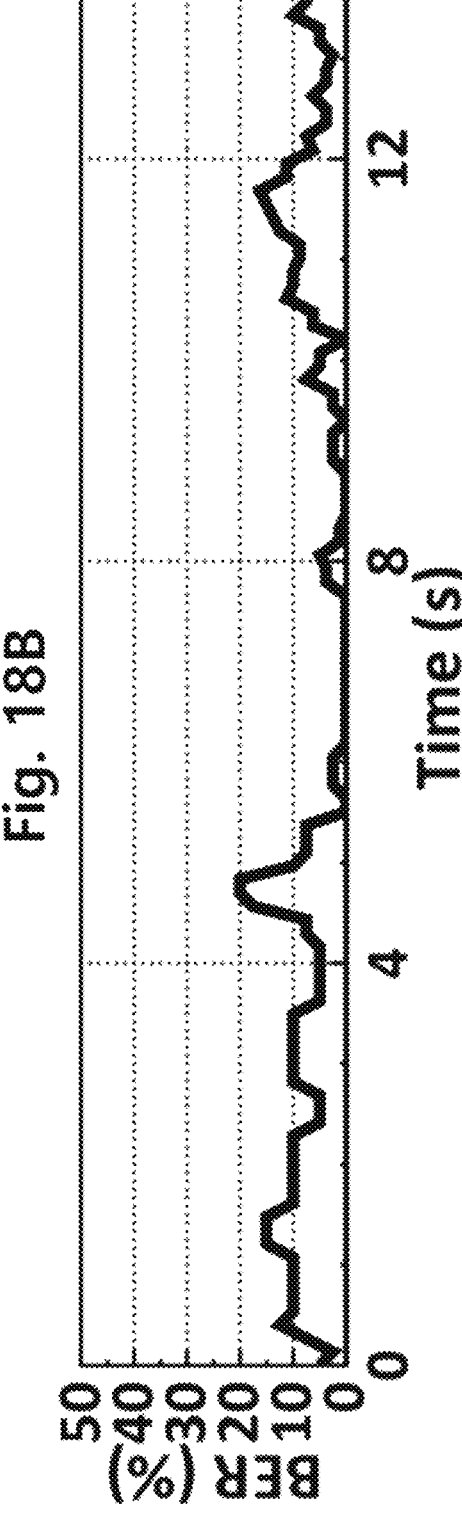
FIG. 18B is a graph showing a BER when the backscatter tag moves vertically from the interrogator.

FIG. 18A illustrates another indoor mobility in which the tag moves vertically 4.32 m (from 2.48 m to 6.8 m) in a straight line for 48.5 seconds at a speed of 0.9 m/s. FIG. 18B illustrates the BER over time, and the average BER during movement is 6.2%. The tag was modulated to 156 kHz in both experiments. The shown results show that the plots show successful tag signal demodulation even in the mobile environment. FIG. 17B illustrates the channel allocation according to the time that the channel moves according to the radar-tag distance. From the results of these mobility experiments, it can be confirmed that the present invention has excellent communication performance even in the mobile environment.

According to the present invention, an economical, low-power, and wide-bandwidth backscatter communication device capable of large-scale communication can be provided.

While the present invention has been described with reference to exemplary embodiments illustrated in accompanying drawings in order to help with understanding of the present invention, these should be considered in a descriptive sense only, and it will be understood by those skilled in the art that various modifications and other equivalent embodiments may be made. Therefore, the scope of the present invention is defined by the appended claims.

What is claimed is:

1. A communication device comprising:
an interrogator configured to output an interrogation signal in which a plurality of unit chirp signals are repeated with a predetermined period; and
a backscatter tag configured to provide a tag signal formed by frequency modulation on the interrogation signal, and
wherein the interrogator is further configured to mix a received signal including the tag signal provided by the backscatter tag with the interrogation signal to generate an intermediate signal, perform a Fourier transform on the intermediate signal or a signal filtered from the intermediate signal, and demodulate the tag signal from frequency components excluding noise bins determined according to a predetermined rule among the components generated by the Fourier transform.

2. The communication device of claim 1, wherein the backscatter tag communicates with the interrogator through channels determined according to distances between the interrogator and the backscatter tag.

3. The communication device of claim 1, wherein the interrogation signal belongs to a millimeter wave band.

4. The communication device of claim 1, wherein the interrogator performs Fourier transform on the intermediate signal, the intermediate signal includes:

clutter noise periodically positioned; and a tag signal component positioned without overlapping the clutter noise in a frequency domain.

5. The communication device of claim 1, wherein the signal generated by demodulating the tag signal provided by the backscatter tag includes frequency component corresponding to a moving distance of the interrogation signal between the interrogator and the backscatter tags.

6. The communication device of claim 5, wherein the signal generated by demodulating the tag signal provided by the backscatter tag further includes a frequency component corresponding to a frequency at which the interrogation signal is modulated.

7. The communication device of claim 1, wherein:

the communication device includes a plurality of backscatter tags;

the interrogator provides a single interrogation signal; and the interrogator receives a plurality of tag signals formed by modulating, by the plurality of backscatter tags, the single interrogation signal and performs simultaneous communication with the plurality of backscatter tags.

8. The communication device of claim 4, in the communication device, wherein the clutter noise is in noise bins of the frequency domain, and the tag signal component is in tag bins of the frequency domain.

9. The communication device of claim 1, wherein the interrogation signal is constituted by N periodic unit chirp signals, and the tag signal is in N–1 discrete frequency bins per channel.

10. The communication device of claim 1, wherein the backscatter tag is configured to frequency-modulate the interrogation signal received by the backscatter tag from the interrogator, without information about a channel allocated to the backscatter tag, and provide the frequency-modulated output signals as the tag signal.

11. The communication device of claim 1, wherein the plurality of unit chirp signals are phase continuous.

12. The communication device of claim 1, wherein the interrogator comprises a demodulation unit configured to demodulate the tag signal, and the demodulation unit comprises:

a mixer configured to mix the interrogation signal with the received signal including a tag signal formed by frequency-modulating the interrogation signal by a backscatter tag to generate an intermediate signal;

a Fourier transform unit configured to Fourier-transform the intermediate signal; and a filter configured to block the frequency component, among the intermediate signal, corresponding to the sum of the frequencies of the tag signal and the frequencies of the interrogation signal.

13. The communication device of claim 1, wherein the interrogator comprises a demodulation unit configured to demodulate the tag signal, and the demodulation unit comprises:

a filter configured to receive the intermediate signal and pass a signal component having a frequency corresponding to a difference between the frequencies of the interrogation signal and the frequencies of the tag signal.

14. The communication device of claim 8, wherein the tag signal is in one or more tag bins, and are spaced a frequency at which the backscatter tag modulates, from a plurality of noise bins respectively adjacent to the one or more tag bins.

15. The communication device of claim 14, wherein the interrogator comprises a demodulation unit configured to demodulate the tag signal, and when the backscatter tag is moving, the demodulation unit tracks signals of the moving backscatter tag by tracking signals spaced the frequency modulated by the backscatter tag, from the plurality of noise bins.

16. The communication device of claim 1, wherein the backscatter tag is included in Internet-of-Things (IOT) device.

17. The communication device of claim 1, wherein the backscatter tag operates with power collected by energy harvesting.

18. The communication device of claim 1, wherein the backscatter tag operates with power provided by battery.

19. An interrogator comprising:

a signal generator configured to output an interrogation signal in which a plurality of unit chirp signals are repeated with a predetermined period; and a demodulation unit;

wherein the demodulation unit comprises:

a mixer configured to mix a received signal including a tag signal formed by frequency-modulating the interrogation signal by a predetermined backscatter tag with the interrogation signal to generate an intermediate signal; and a Fourier transformer configured to perform a Fourier transform on the intermediate signal or a signal filtered from the intermediate signal, wherein the demodulation unit is further configured to demodulate the tag signal from frequency components excluding noise bins determined according to a predetermined rule among the components generated by the Fourier transform.

20. A communication method in which an interrogator including a signal generator and a demodulate unit communicates with a backscatter tag, the method comprising:

outputting, by the signal generator, an interrogation signal in which a plurality of unit chirp signals are repeated with a predetermined period;

mixing, by the demodulation unit, a received signal including a tag signal formed by frequency-modulating the interrogation signal by the backscatter tag with the interrogation signal to generate an intermediate signal;

performing, by the demodulation unit, a Fourier transform on the intermediate signal or a signal filtered from the intermediate signal; and demodulating, by the demodulation unit, the tag signal from frequency components excluding noise bins determined according to a predetermined rule among the components generated by the Fourier transform.

* * * * *